(12) United States Patent
Gupta

(10) Patent No.: US 7,418,459 B2
(45) Date of Patent: *Aug. 26, 2008

(54) OBJECT ORIENTED BASED, BUSINESS CLASS METHODOLOGY FOR PERFORMING DATA METRIC ANALYSIS

(75) Inventor: Arun K. Gupta, Easton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/835,081

(22) Filed: Aug. 7, 2007

(65) Prior Publication Data

US 2008/0010312 A1 Jan. 10, 2008

Related U.S. Application Data

(60) Continuation of application No. 11/019,924, filed on Dec. 21, 2004, now Pat. No. 7,386,571, which is a division of application No. 09/651,226, filed on Aug. 30, 2000, now Pat. No. 6,853,994.

(51) Int. Cl.
*G06F 17/30* (2006.01)
(52) U.S. Cl. .................................. 707/102; 707/104.1
(58) Field of Classification Search .................. 707/1, 707/10, 100, 101, 102, 103 R, 13 Y, 103 X, 707/104.1; 717/101, 102, 104, 116, 148, 717/165, 166, 171, 176; 705/7, 22, 28, 29; 706/45, 476, 47, 50, 925; 709/201; 712/28, 712/29, 30, 225; 715/700, 744, 749
See application file for complete search history.

(56) References Cited

U.S. PATENT DOCUMENTS

| 4,367,525 | A | 1/1983 | Brown et al. |
|---|---|---|---|
| 4,542,458 | A | 9/1985 | Kitajima et al. |
| 4,665,478 | A | 5/1987 | Hirose et al. |
| 5,257,371 | A | 10/1993 | Anezaki |
| 5,265,250 | A | 11/1993 | Andrade et al. |
| 5,305,389 | A | 4/1994 | Palmer |
| 5,327,559 | A | 7/1994 | Priven et al. |
| 5,485,610 | A | 1/1996 | Gioielli et al. |
| 5,584,035 | A | 12/1996 | Duggan et al. |
| 5,644,770 | A | 7/1997 | Burke et al. |
| 5,655,150 | A | 8/1997 | Matsumoto et al. |

(Continued)

OTHER PUBLICATIONS

Iwona Dubielewicz et al, "Feasibility Analysis of MDA-based Database Design", (Apr. 7, 2006), IEEE Proc. of the International Conference o Dependabiity of Computer Systems (DEPCOS-RELCOMEX'06), pp. 1-8.*

(Continued)

*Primary Examiner*—Diane Mizrahi
(74) *Attorney, Agent, or Firm*—Hamilton, Brook, Smith & Reynolds P.C.

(57) ABSTRACT

A method for modeling business activities defines a plurality of business classes. Each business class is a generic definition of corresponding data elements of business activities. Business activities are modeled as interactions and relationships between the plurability of business classes. The business classes and data elements are stored in an operational database, in a matter enabling user-selected data elements to be retrieved. The retrieval of data elements is in accordance with a metric analysis profile.

14 Claims, 33 Drawing Sheets

U.S. PATENT DOCUMENTS

| | | |
|---|---|---|
| 5,675,739 A | 10/1997 | Eilert et al. |
| 5,680,617 A | 10/1997 | Gough et al. |
| 5,692,215 A | 11/1997 | Kutzik et al. |
| 5,694,601 A | 12/1997 | White et al. |
| 5,706,505 A | 1/1998 | Fraley et al. |
| 5,710,920 A | 1/1998 | Maruyama et al. |
| 5,721,900 A | 2/1998 | Banning et al. |
| 5,721,901 A | 2/1998 | Banning et al. |
| 5,721,912 A | 2/1998 | Stepczyk et al. |
| 5,724,556 A | 3/1998 | Souder et al. |
| 5,732,257 A | 3/1998 | Atkinson et al. |
| 5,751,909 A | 5/1998 | Gower |
| 5,758,349 A | 5/1998 | Breslau et al. |
| 5,764,958 A | 6/1998 | Coskun |
| 5,809,266 A | 9/1998 | Touma et al. |
| 5,832,481 A | 11/1998 | Sheffield |
| 5,835,724 A | 11/1998 | Smith |
| 5,835,758 A | 11/1998 | Nochur et al. |
| 5,842,213 A | 11/1998 | Odom et al. |
| 5,848,145 A | 12/1998 | Gallagher et al. |
| 5,850,548 A | 12/1998 | Williams |
| 5,850,631 A | 12/1998 | Golshani et al. |
| 5,864,862 A | 1/1999 | Kriens et al. |
| 5,872,969 A | 2/1999 | Copeland et al. |
| 5,872,971 A | 2/1999 | Knapman et al. |
| 5,884,081 A | 3/1999 | Burbeck |
| 5,892,917 A | 4/1999 | Myerson |
| 5,893,105 A | 4/1999 | MacLennan |
| 5,901,319 A | 5/1999 | Hirst |
| 5,903,897 A | 5/1999 | Carrier, III et al. |
| 5,907,847 A | 5/1999 | Goldberg |
| 5,911,075 A | 6/1999 | Glaser et al. |
| 5,913,061 A | 6/1999 | Gupta et al. |
| 5,915,253 A | 6/1999 | Christiansen |
| 5,924,109 A | 7/1999 | Ackerman et al. |
| 5,946,682 A | 8/1999 | Wolfe |
| 5,946,694 A | 8/1999 | Copeland et al. |
| 5,956,506 A | 9/1999 | Cobb et al. |
| 5,961,601 A | 10/1999 | Iyengar |
| 5,964,828 A | 10/1999 | Cummins |
| 5,966,535 A | 10/1999 | Benedikt et al. |
| 5,970,498 A | 10/1999 | Duffield et al. |
| 5,974,443 A | 10/1999 | Jeske |
| 5,978,842 A | 11/1999 | Noble et al. |
| 5,991,535 A | 11/1999 | Fowlow et al. |
| 6,003,037 A | 12/1999 | Kassabgi et al. |
| 6,014,637 A | 1/2000 | Fell et al. |
| 6,038,558 A | 3/2000 | Powers et al. |
| 6,055,522 A | 4/2000 | Krishna et al. |
| 6,061,686 A | 5/2000 | Gauvin et al. |
| 6,076,108 A | 6/2000 | Courts et al. |
| 6,094,662 A | 7/2000 | Hawes |
| 6,098,093 A | 8/2000 | Bayeh et al. |
| 6,108,004 A | 8/2000 | Medl |
| 6,129,274 A | 10/2000 | Suzuki |
| 6,163,878 A | 12/2000 | Kohl |
| 6,185,608 B1 | 2/2001 | Hon et al. |
| 6,225,995 B1 | 5/2001 | Jacobs et al. |
| 6,230,196 B1 | 5/2001 | Guenthner et al. |
| 6,275,858 B1 | 8/2001 | Bates et al. |
| 6,457,047 B1 | 9/2002 | Chandra et al. |
| 6,591,266 B1 | 7/2003 | Li et al. |
| 6,606,525 B1 | 8/2003 | Muthuswamy et al. |
| 6,697,850 B1 | 2/2004 | Saunders |
| 6,701,367 B1 | 3/2004 | Belkin |
| 6,757,708 B1 | 6/2004 | Craig et al. |
| 6,757,900 B1 | 6/2004 | Burd et al. |
| 6,871,211 B2 | 3/2005 | Labounty et al. |
| 6,898,783 B1 | 5/2005 | Gupta et al. |
| 2002/0010753 A1 | 1/2002 | Mutsuoka et al. |
| 2002/0116257 A1 | 8/2002 | Helbig |
| 2002/0120710 A1 | 8/2002 | Chintalapati et al. |
| 2003/0018612 A1 | 1/2003 | Melbin |
| 2003/0046365 A1 | 3/2003 | Pfister et al. |
| 2003/0120752 A1 | 6/2003 | Corcoran |
| 2003/0229695 A1 | 12/2003 | McBride |
| 2005/0102273 A1* | 5/2005 | Gupta .......................... 707/2 |
| 2006/0255124 A1 | 11/2006 | Hoch et al. |
| 2007/0244738 A1* | 10/2007 | Chowdhary et al. ........... 705/10 |

OTHER PUBLICATIONS

Information Business Objects, "Accelerating and Improving Business Analytics", (Apr. 23, 2003), http://www.businessobjects.com/pdf/products/dataintegration/warehouse, pp. 1-4.*

Grant A. Jacoby et al., "Critical Business Requirements Model and Metrics for Intranet Roi", (Feb. 28, 2005) Journal of Electronic Commerce Research, vol. 6, No. 1, http://www.csulb.edu/web/journal/jecr/issues, pp. 1-30.*

Sugato Bagchi et al., "Capacity planning tools for web and grid environments", (Oct. 1, 2006), ACM Intern. Proc. Series vol. 180, Article No. 256, ACM, NY NY, pp. 1-10.*

* cited by examiner

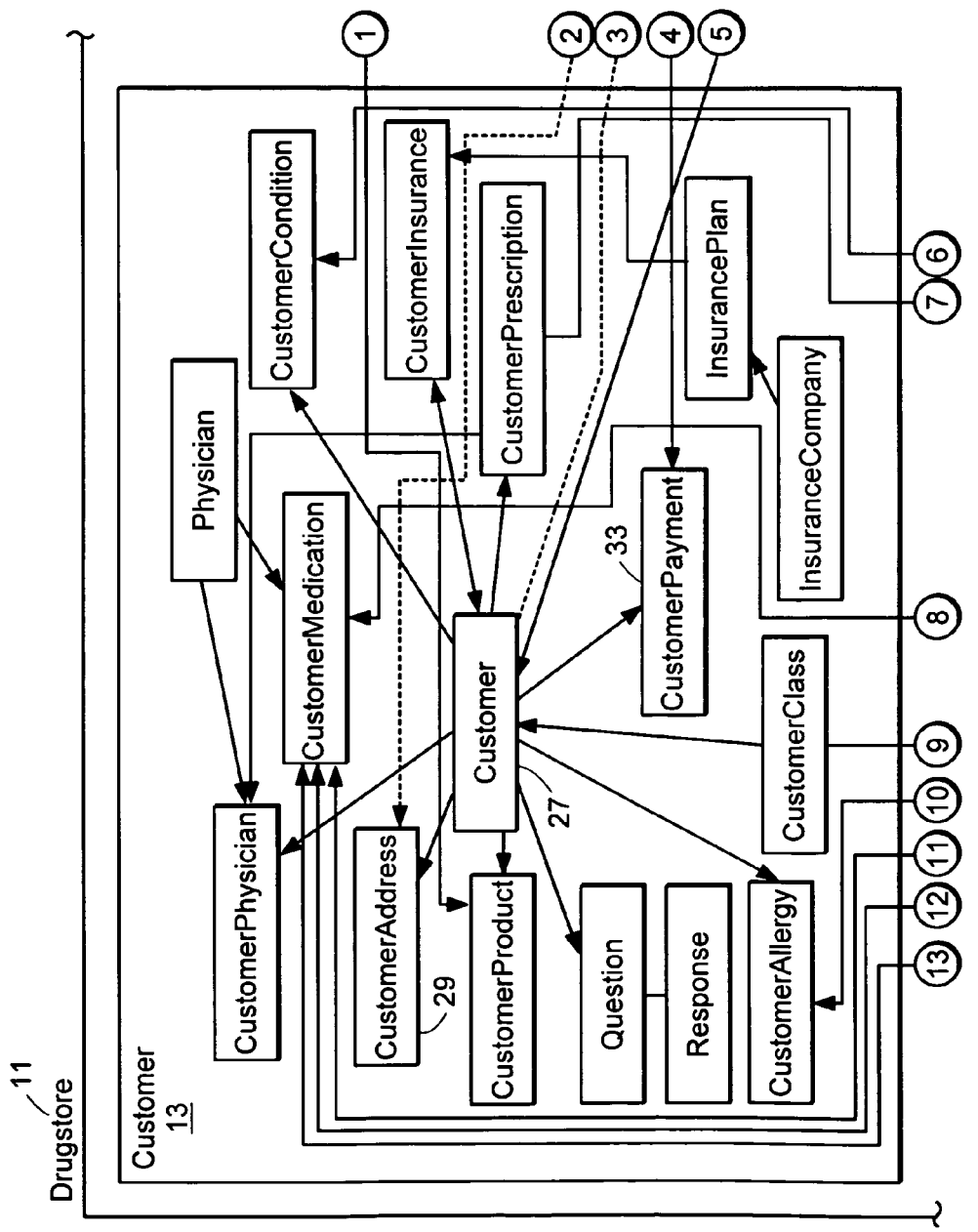

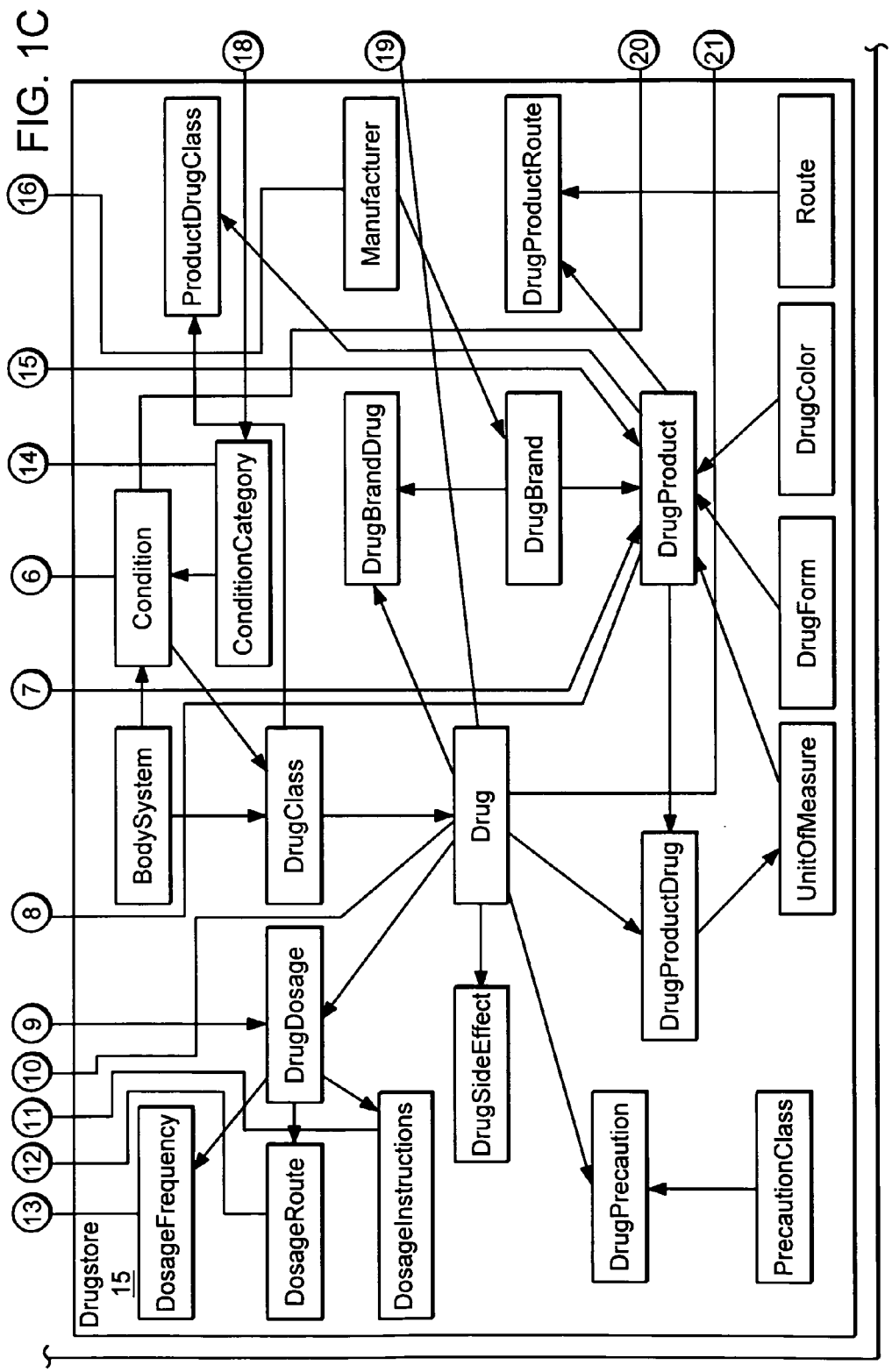

Control Properties

State

Process State: XStatus

State Name: [ initiated / inprogress / complete ] — 2217

Description:

Next Step: — 2211, 228

Analytics
- ☐ Start State — 2213
- ☐ Capture Time — 2215

Since: — 2219

Reporting Label:

[ OK ]  [ Cancel ]  [ Apply ]

FIG. 22

OBJECT ORIENTED BASED, BUSINESS CLASS METHODOLOGY FOR PERFORMING DATA METRIC ANALYSIS

RELATED APPLICATION

This application is a continuation of U.S. application Ser. No. 11/019,924, filed Dec. 21, 2004 now U.S. Pat. No. 7,386,571 which is a divisional of U.S. application Ser. No. 09/651,226, filed Aug. 30, 2000 (now U.S. Pat. No. 6,853,994), the entire teachings of which are incorporated herein by reference.

BACKGROUND OF THE INVENTION

This invention relates to a method for performing metric data analysis, and more particularly to an object oriented based methodology for selecting and defining both measures and dimensions for metric analysis implemented in a web based computing environment.

DESCRIPTION OF THE RELATED ART

Data mining and database warehousing allow users to analyze large databases to solve business decision problems. Data mining is, in some ways, an extension of statistics, with the addition of artificial intelligence and machine learning.

Data warehousing involves the retrieval from an operational relational database of a subset of a business' data and the subsequent storage of the data in a staging relational database. Typically, the retrieval and storage of such data occurs as the result of the execution of a scheduled background process. This scheduled background process, or batch process, is scheduled to run at a time when large retrievals from the operational database will cause the least interference with business activities.

The subset of data chosen for retrieval is selected based on business analysis criteria. Specifically, data is retrieved for analysis purposes which represent meaningful measures of business activity or from which may be derived such measures. Examples might include the row entries of all suppliers of goods for which orders were filled and the number of orders filled by each. Additional information night include a numeric region code from which each supplier satisfied the provision of goods for a particular order.

Once extracted, the mined data could allow a user to query in a number of useful manners. For example the user might query this data to spot trends in the number of orders filled by individual suppliers. Alternatively, the user might wish to determine the distribution of orders fulfilled by region regardless of the identity of the supplier. As yet another alternative, the user may wish to derive information from data not specifically stored in the database. For example, the user may wish to determine the amount of time a typical customer's order requires for processing. If the time of order initiation and completion is recorded, the duration of the order process may be determined.

It is possible to perform data mining queries directly on the operational database. Such queries may be performed through any number of relational database interfaces which permit SQL queries such as Enterprise Manager by Microsoft Corporation of Redmond. However, this methodology suffers from several drawbacks. One drawback is the potential for a data bottleneck to form around the interface between any data analysis tool and the operational relational database. As it is the primary responsibility of the operational database to support real-time, business critical data support, a large number of queries generated for analysis purposes imposes a potentially crippling data access overload. An additional downside to issuing analysis queries directly against the operational database is the less than optimal structure of the database for purposes of analysis. Because the operational database is typically designed to support all the business needs of an enterprise, it likely contains a large volume of data against which data miners possess no need to perform metric analysis. In addition, because the data needed to perform data mining analysis is usually only a small portion of the data contained in the operational database, the data of interest could be much more quickly analyzed if it were separated from non-crucial, in terms of the analysis of interest, data of the operational database. This fact arises from the incremental increase in resources required to search larger databases as opposed to smaller ones.

In order to avoid bottlenecks and to increase the speed at which queries may be performed against metric data, there is commonly employed the process of data warehousing. As noted, typical data warehousing involves the execution of a batch process to extract data from the operational database and store the data in a staging relational database. In one presently known embodiment, the process includes a series of structured query language (SQL) statements. When these SQL statements are executed, desired data is retrieved from the operational database and stored on a staging database.

In addition to data warehousing, software to aid in the analysis of the staging database may be utilized. Analytical reporting features are often provided through the use of OLAP (On-Line Analytical Processing) technologies. OLAP engines and reporting tools provide a multi-dimensional view of data and are optimized for fast aggregation. OLAP tools support commonly used methods of analysis such as drill down on summary data, pivoting and rotating the data in spreadsheets, and filtering data on one or more dimensions. Such functions are broadly referred to as data mining. Reports generated from data in an OLAP format can be more interactive than those generated from relational database tables. Examples of OLAP technologies include OLAP Services from Microsoft of Redmond, Wash. The OLAP engine functions as a buffer between the staging relational database and any analysis tool capable of accessing and displaying the output of the OLAP engine. Examples of such analysis tools include Impromptu from Cognos of Ottawa, Canada.

While the general use of a batch process for populating a staging database through which an OLAP interface provides metric analysis is well known, the present art suffers from three drawbacks which serve to diminish the utility of such a configuration. First, there is no explicit integration between the business model of an organization and the data warehouse and data mining functions. A business may employ a variety of third party and proprietary software components to carry out its business functions. Many of these components will write to and retrieve information from one or more operational databases. As there is no unifying relationship between these components, it requires a great deal of labor and resources to Construct updated batch processes capable of retrieving and storing desired metric data.

Second, the identification of data inside the operational database which should optimally be transferred to the staging database is often not integrated with the process of system design and implementation. Third party software is routinely configured to perform portions of a business's processes. There is no formal connection between different software components and the internal data objects which form the source code for each component are typically not accessible to users of the software. As a result, once a system is configured, the identification of data objects which require metric analysis is laborious and painstaking. In addition, there is no opportunity while configuring or developing the operational system to identify attributes or processes for later analysis.

Lastly, as an architected or integrated computer based system for carrying out business processes is changed to incorporate evolving business practices, maintenance of the batch process becomes increasingly difficult. Specifically, over time, new applications are created and implemented by business users. These new applications will most probably create, access, and edit new data entries in the operational database. Many of these new data entries will have previously undefined, complex relationships with other data entries and will require metric analysis. As a result, human operator intervention is required to re-code, test, and implement updated batch processing software to extract data from the operational database and update the staging relational database.

Therefore, there exists a need for an integrated method of defining business models in which a high level business model is explicitly tied to the definitions of the attributes and processes requiring metric analysis. In addition, there is required a method by which these attributes and processes may be flagged during the development phase of the operational system as requiring metric analysis. It would be of further utility if, in addition to individual attributes and processes, various other related attributes and processes could be easily identified and flagged as well. Lastly, there is needed an automated system for generating the executable code comprising the batch process. Ideally, such code could be generated after any change to the operational system and would reflect the metric analysis needs arising from such changes.

SUMMARY OF THE INVENTION

Accordingly, one aspect of the present invention is drawn to a method for extracting desired data from a digital database comprising the steps of specifying desired data elements to be extracted from an operational database, generating executable code from the identified data elements for extracting the identified data elements from the database, and executing the executable code thereby extracting the identified data elements from the database.

Yet another aspect of the present invention is drawn to the aforementioned method wherein the executable code stores the extracted data elements in a staging database.

Yet another aspect of the present invention is drawn to the aforementioned method wherein the operational database is a relational database.

Still another aspect of the present invention is drawn to the aforementioned method wherein the staging database is a relational database.

Yet another aspect of the present invention is drawn to the aforementioned method wherein identifying the data elements to be extracted comprises the steps of selecting data elements stored in a repository through a graphical user interface.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 22 is a screen dump of the process edit GUI of the present invention.

Like reference numbers and designations in the various drawings indicate like elements.

DETAILED DESCRIPTION OF THE INVENTION

Figure 1B:
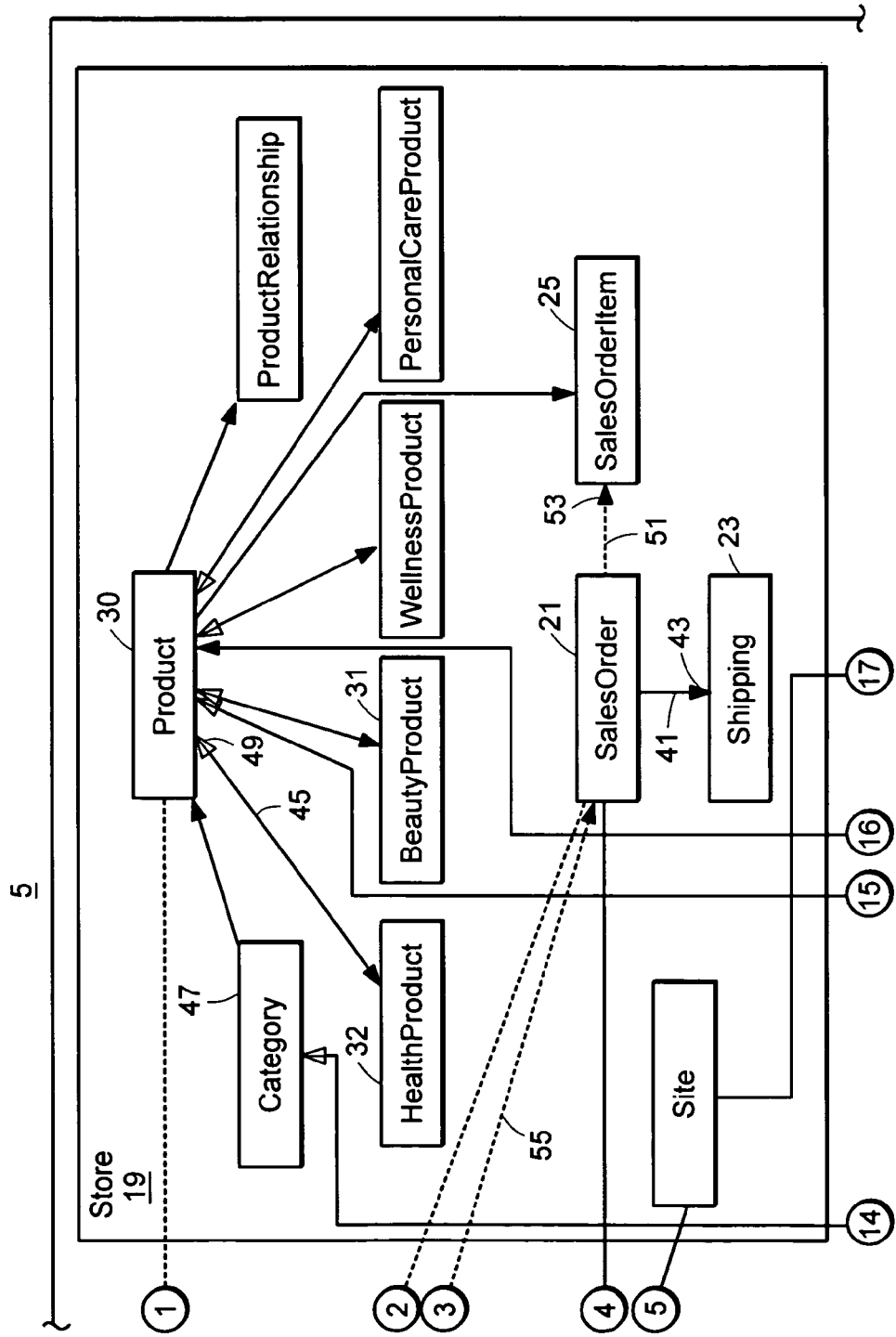
FIG. 1 is a screen rendering of an Object Modeler GUI in accordance with the invention.

The analytics features of the present invention are targeted at providing advanced analytical reporting capabilities for architected systems created through the use of business classes.

When executing software on a computer, a Business Object is a data object, for which storage space on an electronic medium has been allocated, derived from a Business Class template. By template, it is meant that a Business Class defines the generic definition of a Business Object. A data object is an entity stored in an electronic format that is comprised of information. A Business Object is, therefore, a dynamically allocated instance of the static Business Class. A Business Class is comprised of attributes, methods, external messages and web documents. Detailed examples of attributes, methods, external messages and web documents are provided below. The Business Processes, comprising in part the Business Class, are themselves comprised of Business Rules, methods, and subprocesses. Business Rules and Business Processes are defined more specifically below. An advantage of the present invention is the ability to model all business activities as interactions between Business Classes.

The structure and organization of the Business Class is such as to uniquely and completely define the attributes of the Business Class. Because the Business Class, when implemented in computer code will often take the form of an OOP class definition, the structure of Business Classes as herein defined bears superficial resemblance to OOP classes. OOP class definitions form the core of various OOP languages including, but not limited to, C++. However, in accordance with the present invention, Business Classes are not limited to implementations in OOP languages, rather, Business Classes may be implemented in non-OOP languages including, but not limited to, JAVASCRIPT. Business Class information and definitions are stored in a repository in a neutral format from which code can be generated in any required computer language.

A subset of characteristics unique to a specific Business Class is the relationship between the specific Business Class and a plurality of other Business Classes with which the specific Business Class interacts. Other characteristics of the specific Business Class may include attributes, specific to the Business Class, which are not dependent upon a relationship with other Business Classes.

Described herein are several methodologies involving graphical user interfaces (GUI) which, taken together, allow a user to diagram at a high level a plurality of Business Classes, the relationships between Business Classes, and sub-components of Business Classes including, but not limited to, Business Processes and Business Rules. While the following detailed descriptions of the methods by which GUIs may be utilized to perform such diagramming are presented with reference to specific examples, the present invention is not limited to such examples. Rather, the GUI interfaces described herein are intended to broadly encompass any and all graphical means by which a user may interface with a computer, or other electronic device, for the purpose of accomplishing the intended task so described.

As used herein, the term "repository" refers to any aggregation of information whereon data is stored in an electronic format and may retrieved therefrom. As used herein, "electronic format" refers to any mode of storing or manipulating data in digital form. As used herein, "neutral format" refers to a data format which is capable of being expressed in or converted to at least one other computer language including, but not limited to, object oriented computer languages.

Figure 1D:
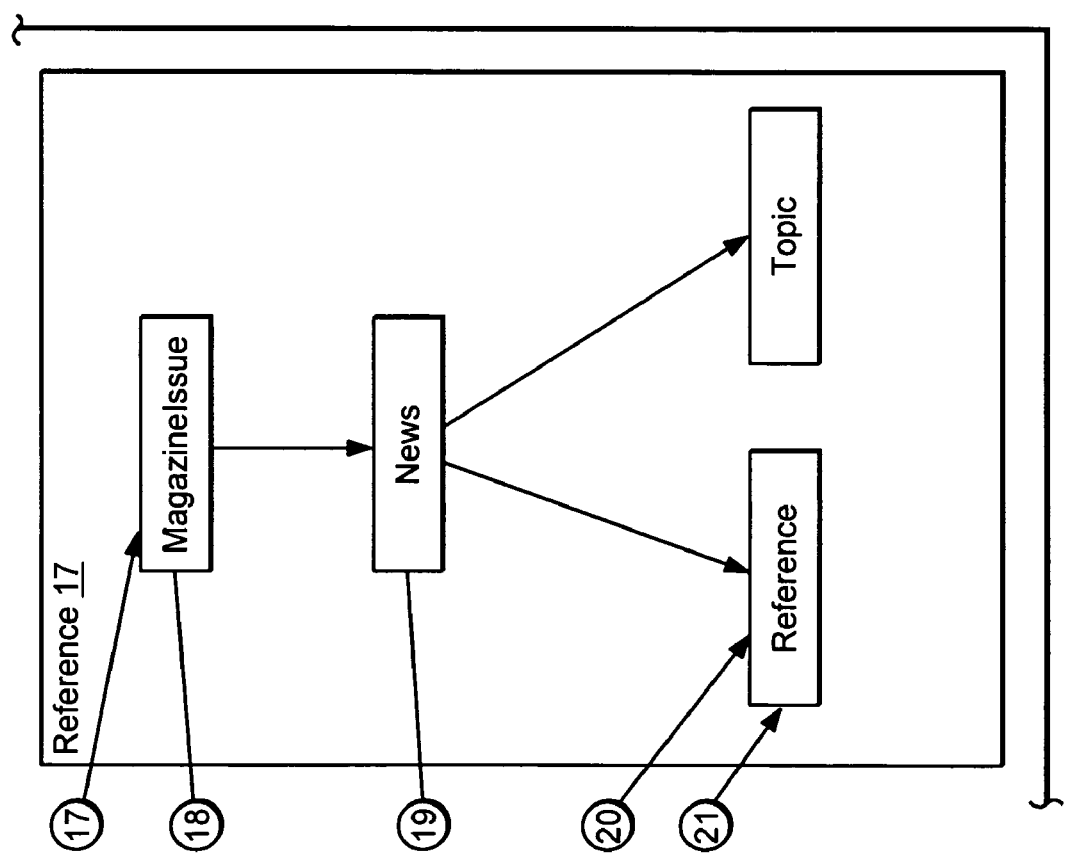

With reference to FIG. 1, there is illustrated a graphical representation of a plurality of Business Classes, their organization, and relationships existing between them. FIG. 1 comprises a Graphical User Interface (GUI) implemented in an Object Modeler 5, through which a user may model any business or process and the attendant operation thereof. Business Classes are grouped to form Subjects. Subjects are combined to form Packages. A Package is utilized to construct a Data Repository on an electronic storage medium. In the present example there is illustrated drugstore 11. Drugstore 11 is a Package comprised of Subjects customer 13, drugstore 15, store 19, reference 17. Each Subject is further comprised of a plurality of Business Classes. A Subject represents a logical grouping of Business Classes.

With continued reference to FIG. 1, store 19 is comprised of a plurality of Business Classes such as Product 30, BeautyProduct 31, HealthProduct 32, SalesOrder 21, Shipping 23, and SalesOrderItem 25. Subject Customer 13 is comprised of, Customer 27, and CustomerAddress 29. Using the GUI interface in a point-and-click manner, a user may define and thereby create Business Classes, drag them on a display device to a desired location, and define the logical relationship between the created Business Class and the other Business Classes. Once created and physically located at a desired point on the display device, the user may define the relationships existing between the Business Class and other Business Classes in a GUI supported manner. For example, SalesOrder 21 was created and placed within store 19. A number of lines either eminating from or terminating at SalesOrder 21, with arrowheads located at at least one end of such each line's terminus, designates a relationship between SalesOrder 21 and a plurality of other Business Classes. Specifically, SalesOrder 21 can be seen to exist in relationships with SalesOrderItem 25, Shipping 23, Customer Payment 33, Customer 27, and CustomerAddress 29.

One method by which Business Classes and relationships are defined and manipulated through the use of a GUI involves selecting a Business Class object from an object palette, dragging a representation of the Business Class object to a desired location on the user's desktop, and dropping the Business Class object at the location. A palette is a collection of icons from which a user may select a desired icon. Similarly, a relationship might be selected from a relationship palette and applied to a Business Class relationship indicated by a line connecting two Business Classes. The present invention is not limited to any one methodology but is intended to broadly encompass the process of using a GUI to diagram Business Classes and their relationships on a user's desktop. A user's desktop includes, but is not limited to, the portion of a viewing monitor within which an operating system displays graphical information to a user.

As is indicated by the format of each line and the arrowheads attached thereto, the aforementioned relationships differ in substance from one another. While any method by which the nature of the lines is visually distinguishable by a user, in the present example lines are presented as either solid or dashed with the arrowheads affixed to at least one terminus of each line represented as either solid or unfilled. A solid line indicates a relationship while a dashed line indicates ownership. A solid arrowhead indicates the nature of the derivation of a relationship while an unfilled arrowhead indicates inheritance. These concepts are described more particularly below.

SalesOrder 21 has a relationship with Shipping 23 as evidenced by solid line 41 and solid arrowhead 43. As each sales order must be shipped, there is seen to be a relationship between the two Business Classes. While indicating a relationship, a solid line provides no further indication of the nature of that relationship. In contrast, dashed line 51 between SalesOrder 21 and SalesOrderItem 25 indicates ownership. The orientation of filled arrowhead 53 terminating at SalesOrderItem 25 indicates that each SalesOrder 21 owns a SalesOrderItem 25. Similarly, each SalesOrder 21 owns a CustomerAddress 29. Note that this relationship exists among Business Classes contained in separate Subjects. SalesOrder 21 is a member of store 19 while CustomerAddress 29 is a member of customer 13. Customer 27 is seen to own SalesOrder 21 via dashed line 55. Therefore, a Business class may own another Business Class as well as be owned by a third Business Class. In the present example, Customer 27 owns SalesOrder 21 and SalesOrder 21 owns SalesOrderItem 25. As will be illustrated, an ownership relationship imposes logical implications on software designed and implemented to carry out the tasks modeled in an Object Modeler.

Product 30 is modeled as possessing relationships with a plurality of Business Classes such as BeautyProduct 31 and HealthProduct 32. Unfilled arrowhead 49 at the terminus of solid line 45 connecting HealthProduct 32 and Product 30 indicate inheritance. The location of unfilled arrowhead at Product 30 indicates that Business Class HealthProduct 32 is inherited from, and is thus the child of, parent Business Class Product 30. As such, Product 30 has been defined to be a template for products. The representation of HealthProduct 32 and BeautyProduct 31 as children of Product 30 indicates that HealthProduct 32 and BeautyProduct 31 are specific instances of the more generalized Business Class 30. As such, HealthProduct 32 and BeautyProduct 31 inherit all of the attributes of Product 30. While the user will likely add additional attributes to HealthProduct 32 and BeautyProduct 31 to reflect the unique characteristics of both, both Business Classes will always contain all of the attributes of the parent Product 30.

Figure 2:
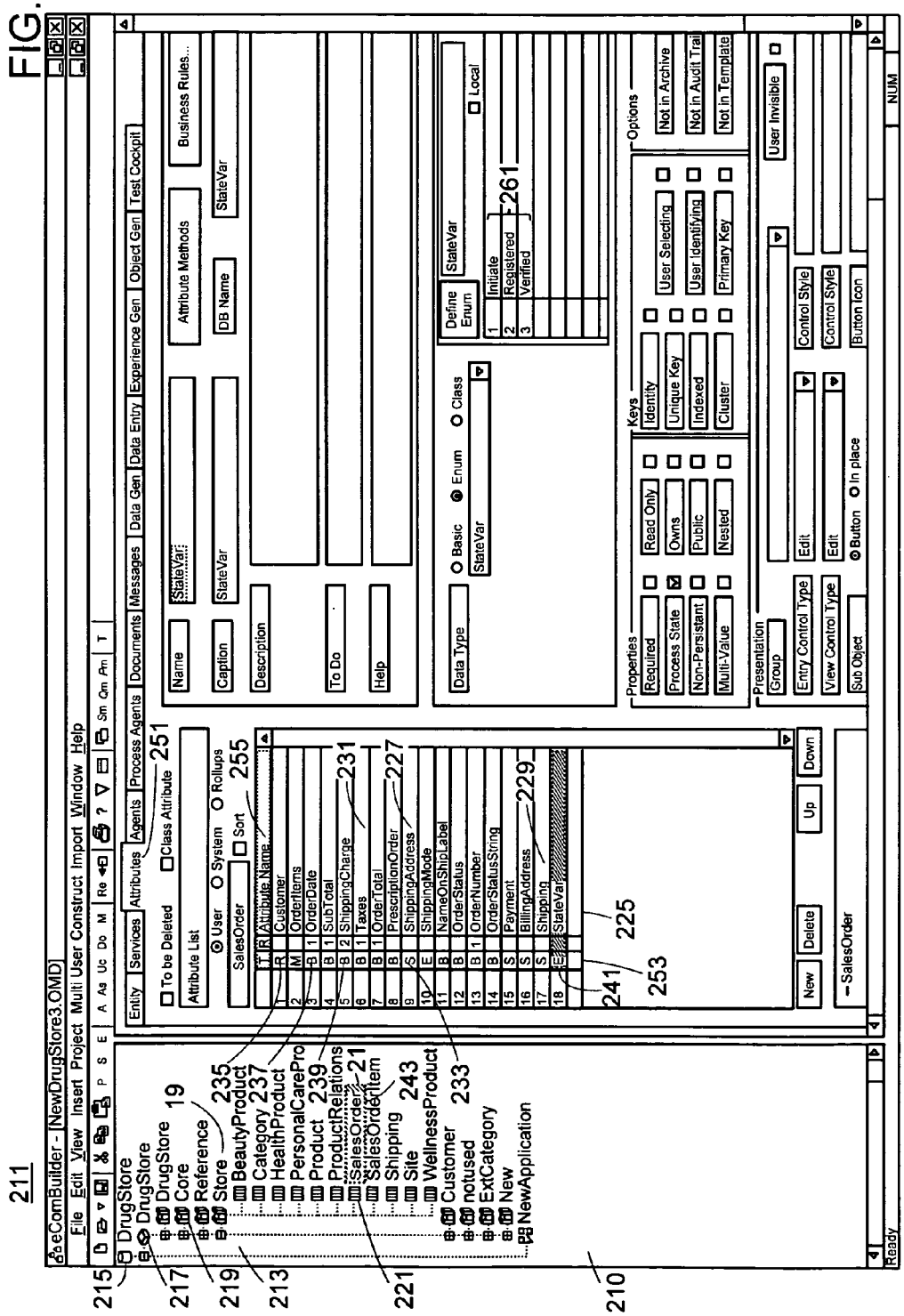
FIG. 2 is a screen rendering of an electronic form based Class Editor GUI for editing the properties of Business Classes.

The visually illustrated attributes of ownership and inheritance impose constraints on the more detailed descriptions of individual Business Classes. The present invention provides a method for translating the visual, GUI created Business Class model, into a repository based aggregation of data elements. Specifically, once defined using the GUI interface, the characteristics of each Business Class so defined are recorded in electronic format on a medium which is either centrally located or which may communicate with other like repositories. With reference to FIG. 2, the present invention comprises an electronic form or text based method for editing the properties of Business Classes. A Class Editor 211 has a class layout portion 210 and an attribute portion 225. Class layout portion 210 is comprised of a plurality of icons arranged so as to illustrate logical groupings of Business Classes. In the present example, repository icon 215 indicates a repository containing all data defining the operation of a drugstore. The drugstore repository of the present example is comprised of a single drugstore Package as indicated by package icon 217. A Package is comprised of one or more subjects. The drugstore Package is comprised of a plurality of Subjects each designated by a subject icon 219. Subject store 19 is illustrated as compromising a plurality of Business Classes. In the present example, SalesOrder 21 is designated as a Business Class by the corresponding business class icon 221. The text "SalesOrder" designating SalesOrder 21 is additionally illustrated as surrounded by a gray rectangle 243. The presence of the gray rectangle 243 is indicative of a user having selected the text through the GUI interface. Such selection may be accomplished through any appropriate means including, but not limited to, single-clicking upon the text.

Class editor 211 is comprised of a series of "tabs" such as attribute tab 251. The tabs serve to logically arrange the plurality of aspects which comprise classes including, but not limited to, subjects, packages, and repositories. With respect to SalesOrder 21, selection by a user of attribute tab 251 causes attribute table 225 to be displayed. Attribute table 225 is comprised of attribute relationship column 253 and attribute name column 255. All of the relationships described above between Business Classes that were defined visually through the GUI by a user are automatically stored in a manner which allows for textual display in attribute table 225. In addition to the information which is derived from the graphical representation of Business Classes illustrated in FIG. 1, the user may enter additional information concerning the attributes of individual Business Classes which are not derived from their relationships with other Business Classes.

Each attribute name listed in attribute name column 255 has an associated value displayed in attribute relationship column 253. Possible values for attribute relationship column 253 include "R", "M", "S", "B", and "E." While the present implementation uses the aforementioned values, any values which may be used that uniquely identify a plurality of attribute relationships. While, in the present example, attribute table 225 includes an entry for each and every Business Class for a which a relationship was defined in FIG. 1, the entry in attribute name column 255 which represents a Business Class possessing a relationship with SalesOrder 21 does not necessarily bear the same name as the Business Class defined in FIG. 1. This follows from the observation that while a single relationship may be established between two entities, the manner in which each entity views the relationship may vary.

For example, consider two persons who are married. There exists a relationship between the two persons. This relationship is optimally a one-to-one relation as each person can be married to no more than one person. The relationship of marriage is the same relationship whether viewed from the perspective of the man or the woman. However, the woman views the person with whom she has a relationship as her husband while the man views the person with whom he has a relationship as his wife. Therefore, if the man is represented as a Business Class, it is preferable to have an entry in attribute table 225 identified as wife. Conversely, the same relationship viewed through the Business Class representing the woman might have an entry for a husband. The present invention provides a method whereby every Business Class can tie a preferred name to a relationship with another Business Class.

Figure 3:
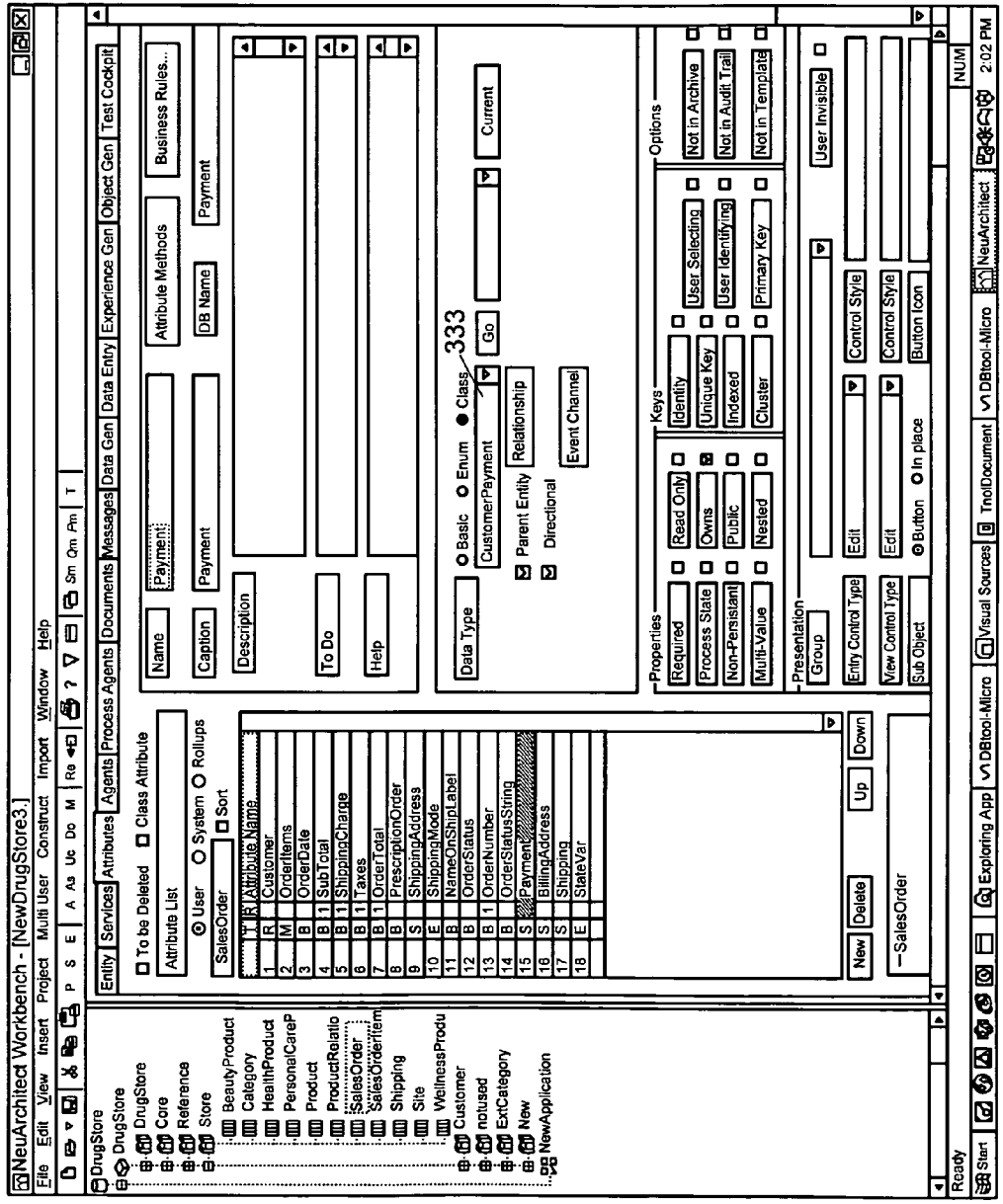
FIG. 3 is a screen rendering of a text-based methodology for displaying attribute data using the Class Editor GUI.

As is illustrated graphically in FIG. 1, each SalesOrder 21 is associated with a CustomerPayment 33. However, attribute name column 255 does not contain an entry for "CustomerPayment." As illustrated in FIG. 3, when the row in attribute name column 225 containing the text "Payment" is selected, the variable name "CustomerPayment" appears in data type entry field 333. Therefore, referring once again to FIG. 2, the "Payment" entry in attribute name column 255 refers to the relationship between SalesOrder 21 and CustomerPayment 33. It will be noted that each entry in attribute name column 255 has an associated entry in attribute relationship column 253. Every relationship between two Business Classes is bi-directional. An entry in the attribute relationship column 253 further defines the nature of the relationship.

An "M" entry indicates a one-to-many relationship. In attribute table 225, the "OrderItems" entry in attribute name column 255 indicates the relationship between SalesOrder 21 and SalesOrderItem 25. Associated with OrderItems is an attribute relationship of "M." This indicates that a single sales order can possess multiple order items.

An "S" attribute indicates a relationship with a Business Class that itself possesses an "R" attribute. Returning to the example of a male class and a female class, the function of the "S" and "R" attributes is apparent. Because each male has one and only one wife, the male class will contain a wife attribute with an "S" relationship attribute. "S" refers to single, as in each male has a single wife. The female class will contain a husband attribute which stands in reference to the wife attribute of the male class. Therefore, the husband attribute of the female class will have an "R" attribute. In addition, there may exist instances where corresponding attributes in separate classes will exhibit an attribute relationship "M" and an attribute relationship "R." In the present example, a male class may have an attribute of daughter with an "M" attribute relationship while the female class will have an attribute of father with an "R" attribute relationship. This results from the fact that a male may have several daughters while each female has one and only one father.

As noted, any number of attribute relationships may be recorded and the present invention is not limited to those described. Rather, any relationship between Business Classes which may be conceived and which serves to define the operation of a Business Class may likewise be captured through the GUI, stored on the repository, and used to generate code and various other data entities related to the Business Class so defined.

Referring to FIG. 2, attribute name "Customer" entered in attribute name column 255 has an associated attribute "R" 235. Attribute name "ShippingAddress" entered in attribute name column 255 has an associated attribute "S," 235. Therefore, SalesOrder 21 relates back to Customer 27 while CustomerAddress relates back to SalesOrder 21.

The attribute "B" refers to a basic data type. A basic data type is usually implemented in computer code as a numeric value including, but not limited to, integers and floating point numbers. In addition, a basic type may be comprised of a byte sequence representing text. The attribute "E" refers to an enumerated data type. Enumerated data types contain integer values with each unique integer value representing a state as illustrated more fully below. Note that in FIG. 2, attribute name "StateVar" entered in attribute name column 255 has an associated attribute "E" 235. The gray area surrounding the text "StateVar" indicates that a user has selected the entry by clicking on the text or though other appropriate means. As a result of the selection, data type information is displayed in data type table 261. There is illustrated enumerated values of "1", "2", and "3" associated with states "Initiate", "Registered", and "Payment Processed" respectively.

Figure 4:
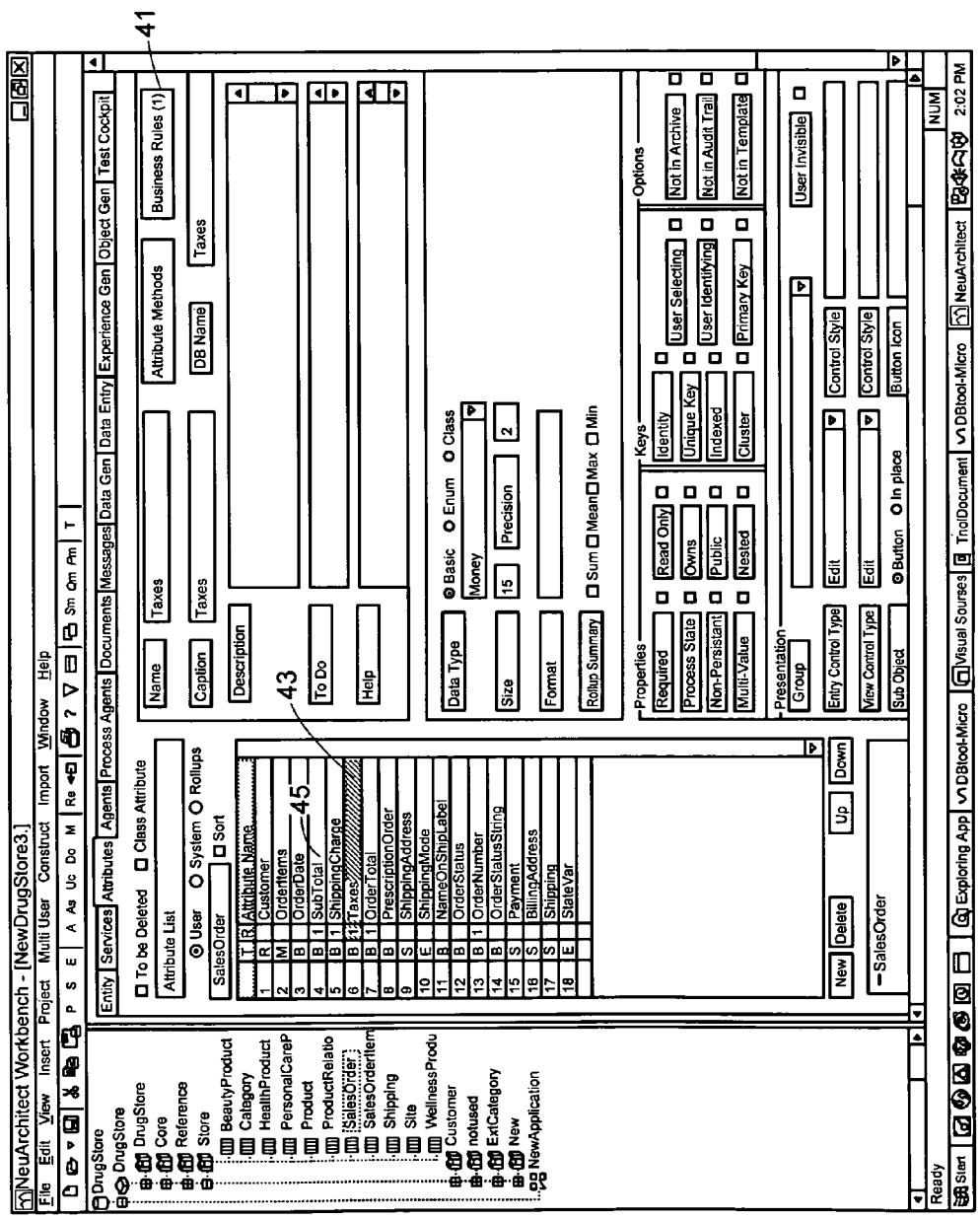
FIG. 4 is a screen rendering of the Class Editor GUI of FIG. 2 illustrating class attributes and their attendant business rules.
Figure 5:
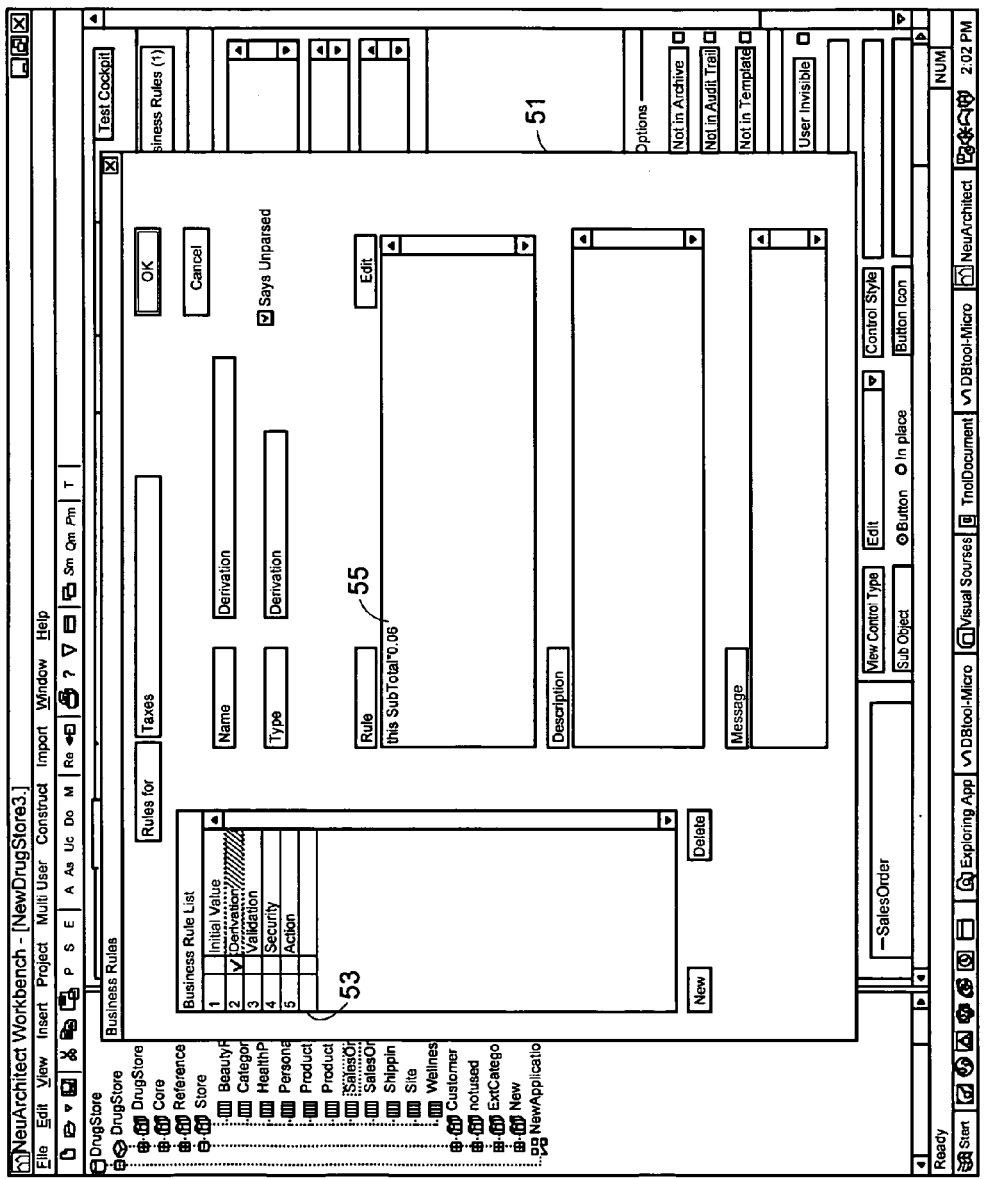
FIG. 5 is a screen rendering of the business rule portion of the Class Editor GUI of FIG. 2.

A basic data type, such as "Taxes", may have one or more associated Business Rules. Business Rules are tied to attributes. With reference to FIG. 4, attribute "Taxes" has been selected and appears highlighted. As a result, Business Rule button 41 is re-plotted with the annotation "(1)." If more than one Business Rule were associated with "Taxes," the annotation appearing in Business Rule button 41 would reflect the number of Business Rules so associated. Clicking on Business Rule button 41 invokes Business Rule window 51 as illustrated in FIG. 5. Business Rule window 51 is comprised of Business Rule table 53 and business rule 55. Business Rule table 53 lists five types of Business Rules including, but not limited to, "Initial Value", "Derivation", and "Validation". An example of an initial value Business Rule would be "this.Quantity=0". An example of a validation Business Rule might consist of the following code;

```
If (this.Quantity > 0)
    return TRUE;
else
    return FALSE;
```

An example of a derivation Business Rule might consist of the following code:

this.Quantity1=this.Quantity2*this.Quantity3;

A Business Rule is comprised of logic which contains sufficient structure to enable the generation of computer executable code to perform the defined functionality. An example of such exemplary code is "this.SubTotal*0.06". Business Rules may be tied to an entire Business Class, and hence to all Business Objects derived therefrom, or to an individual instance of a Business Class.

In the present example, business rule 55 is comprised of the following logic; "this.SubTotal*0.06". Because business rule 55 is of type "Derivation," the logic serves to specify how the value of taxes attribute is derived or computed. Using logic descriptors similar to the syntax of C++, business rule 55 states that the value of taxes attribute 43 is to equal the value of attribute subtotal 45 multiplied by 0.06. Attribute subtotal 45 may itself derive its value from a Business Rule which states a dependence on one or more other attributes. As illustrated, all SalesOrder Business objects derived from the SalesOrder Business Class will inherit the described taxes business rule 55. However, it is preferable to have a method by which the individual attributes of Business Objects are derived and processed different from one another based upon the unique characteristics of the Business Object. The present invention allows for the incorporation into a Business Rule of logic which is specific to a particular instantiation of a Business Object.

For example, to calculate a separate discount rate for businesses purchasing goods from a particular web site one could code a derivation Business Rule which would return a different discount rate based upon the identity of the buyer. Such a Business Rule might appear as follows:

```
if this.customer = "Joe"
    then this.discount = .06;
else if this.customer = "Fred"
    then this discount = .09;
else if this.customer = "John"
    then this.discount = ".03";
```

In this manner, different customers would receive different discount rates. However, such a methodology relies on hard-coding the identity of customers and their attendant discount rates. Using such a methodology presents challenges when a new customer is added. Specifically, such a methodology requires that the Business Rule within which each separate discount rate is specified contains a hard-coded algorithm for deriving the appropriate discount rate for a given customer. If in the future another customer were added, it would be necessary to re-code the Business Rule to include new discount rate derivation code, regenerate the run time application components of the architecture, and redistribute the new components. Such a process requires considerable new code to be added to an existing architecture requiring potentially laborious testing.

The present invention avoids these drawbacks by allowing a reference in a Business Rule to a row and column in a relational database associated with a defined attribute. While the present invention is illustrated herein with reference to a relational database, the present invention is drawn broadly to the use of any form of memory storage capable of receiving a request for data based upon identifying criteria and returning the data so requested. In this manner, one is able to locate a portion of the logical code comprising a Business Rule outside of the Business Rule definition contained in a Business Class. When such a Business Rule is invoked at run-time, the referenced portion of the Business Rule located externally in the relational database is retrieved and executed. Such execution may consist of interpreting the code or compiling and subsequently executing the code. The result of such a method is the ability to change the functionality of a statically defined Business Rule based upon the identity of a customer or other Business Class attribute.

As has been illustrated, the attributes corresponding to a Business Class fall generally into two groups, those which can be derived from the graphic representation of Business Class relationships as illustrated in FIG. 1, and those which must be manually defined. Regardless of which of the two types into which an individual attribute falls, Business Rules may be defined and tied to the attribute. Regardless of whether a Business Rule accesses the values of other attributes, each Business Rule is tied to one and only one attribute. In contrast to the attribute dependent nature of Business Rules, there exists Business Class level Business Processes which are tied to individual Business Classes, bike Business Classes, however, a portion of the logic required to implement Business Processes may be derived from a graphical representation of the relationship between Business Processes.

Figure 6:
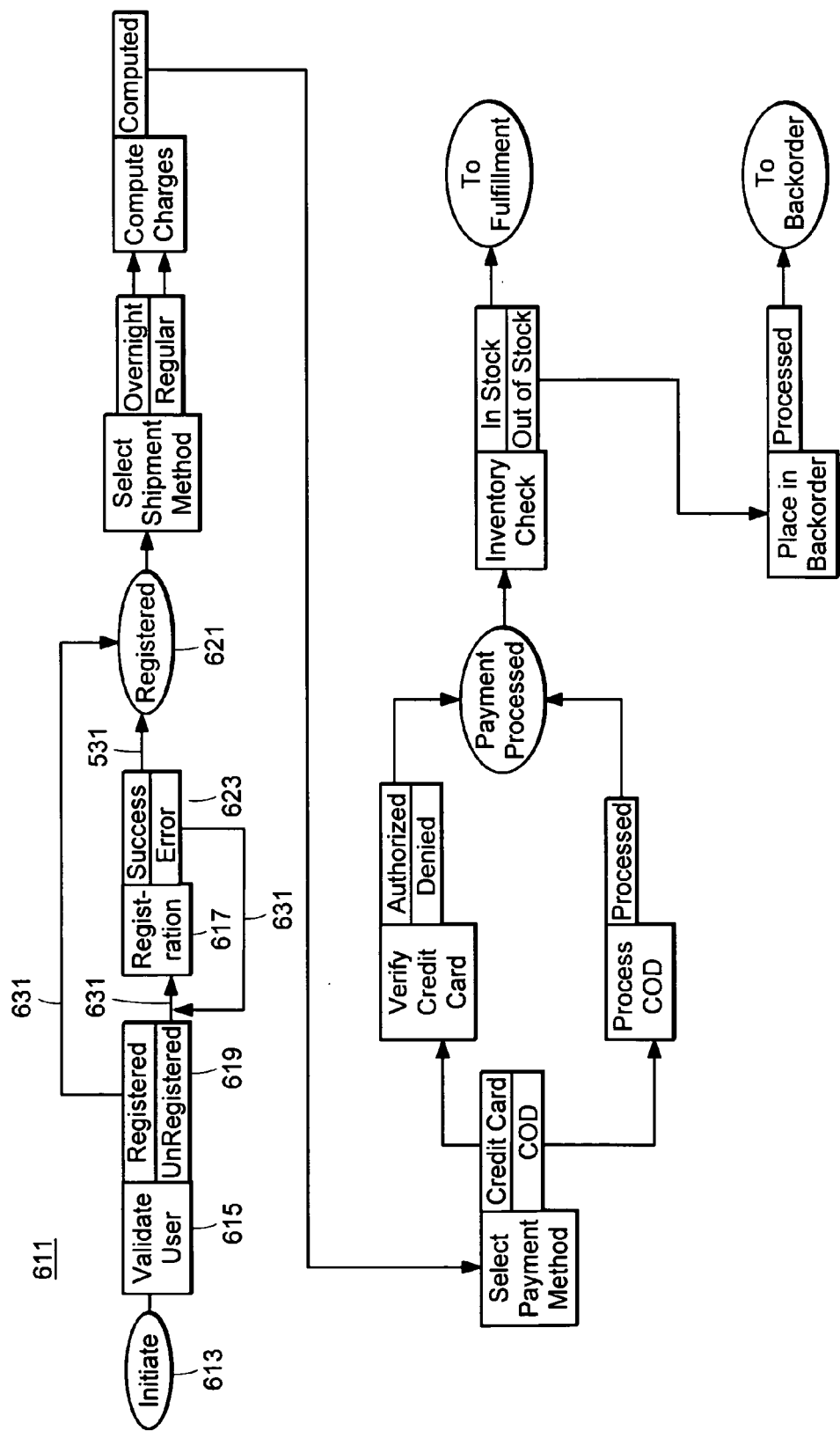
FIG. 6 is a screen rendering of a Business Process Editor GUI.

Business Processes are comprised of states and subprocesses, may be comprised of one or more Business Methods, or may consist of one or more manual processes. A state is the present condition of a Business Class. As detailed with reference to FIG. 2, attribute "StateVar" is an enumerated data type where possible states include "Initiate," "Registered," and "Payment Processed." Subprocesses consist of the logic or operations required to move a Business Class from state to state. FIG. 6 illustrates the GUI interface for the present invention's Business Process Editor 611. Business Process Editor 611 allows the user to define states 613, and 621, Subprocesses 615 and 617, and the states 619, 623 which result from the operation of Subprocesses. Focusing on a portion of the state diagram illustrated in Business Process Editor 611, the user has created elliptical state icons 613 and 621, rectangular Subprocess icons 615 and 617, and rectangular state icons 619 and 623 attached thereto. Such shapes are exemplary and not required. The portion of the Business Process thusly comprised illustrates the initial state of the Business Class SalesOrder shown as initiate state 613, and the Business Methods validate user 615 and registration 617 required to move Business Class SalesOrder to registered state 621.

As is illustrated, the user has created an icon and assigned a textual attribute of "initiate" to form initiate state 613. Next, the user defined two Business Methods in series with initiate state 613 and connected by arrow lines 631. The Business Methods were next assigned the textual attributes of "Validate User" and "Registration" to form validate method 615 and registration method 617. Associated with each method 615, 617 are the states resulting from the operation of the methods. In the present example, the user has defined two possible outcomes for validate method 615: registered or unregistered. Similarly, the user has defined two possible outcomes for registration method 517: success or error. Connected to registration method 617 via arrow line 631 is registered state 621. Each arrow line 631 indicates the direction of logical flow of the Business Process. In the present example a sales order with a state of "initiate" proceeds to validate the user. The diagram of FIG. 5 illustrates that the process of user validation will be accomplished through the implementation of a Business Method identified as validate method 615. Upon completion of performing validate method 615, the state of the user will be either "registered" or "unregistered". If the result is "registered," the logical flow continues, via arrow line 631, directly to registered state 621. If the result is "unregistered," the logical flow continues to registration method 617. Upon completion of performing registration method 617, the state of the registration will be either "success" or "error". If the result is "success," the logical flow continues, via arrow line 631, directly to registered state 621. If the result is "error," the logical flow continues to perform once again registration method 617.

In a manner similar to that illustrated with reference to FIG. 1 and Object Modeler 5, Business Process Editor 611 allows a user, through the utilization of a GUI, to define the logical relationship between entities. While Object Modeler 5 allows the user to define the relationship between Business Classes, Business Process Editor 611 allows the user to define the relationship between Business Class states and Business Methods. In addition, Business Process Editor 611 also allows for the conversion of user defined graphical relationships into detailed, logical abstractions which facilitate the creation of computer code necessary to perform the Business Process so defined.

Figure 7:
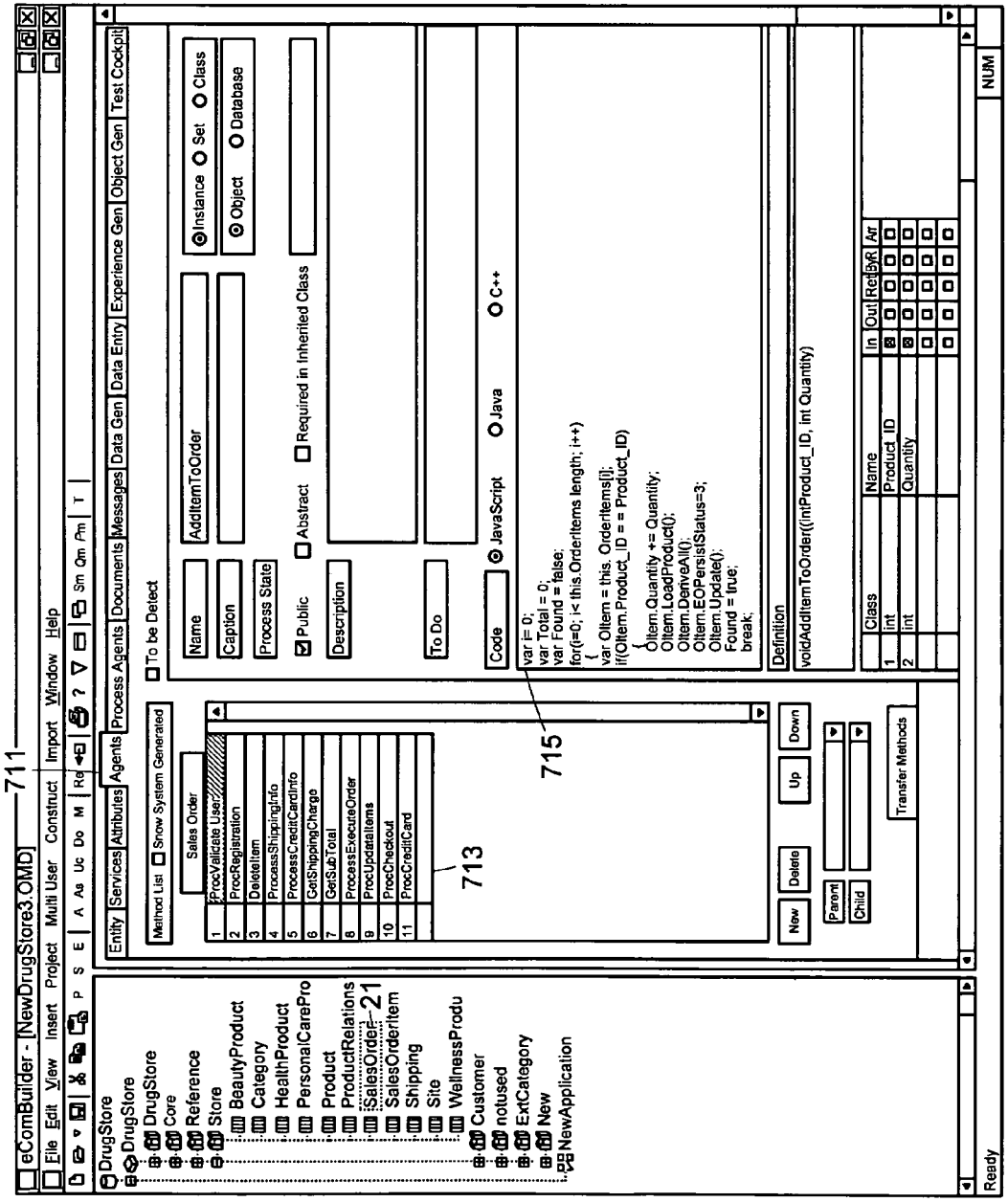
FIG. 7 is a screen rendering of a GUI utilized to display Business Methods.

As described above with reference to FIG. 2, there is illustrated attribute name "StateVar" entered in attribute name column 255 with an associated attribute "E" 235. There is additionally illustrated enumerated values of "1", "2" and "3" associated with states "Initiate", "Registered", and "Payment Processed" respectively. These states were derived from the graphical description of the Business Process illustrated in FIG. 6. With reference to FIG. 7, there is illustrated the GUI utilized by a user to define Business Methods. Note, as with FIG. 2, SalesOrder 21 is selected. Once selected, the user may click, or otherwise select, agents tab 711 to display Business Method information. Selecting agents tab 711 causes Business Method table 713 and Business Method code window 715 to be displayed. Business Method table 713 lists all Business Methods associated with SalesOrder 21. Some of these Business Methods are derived from the relationships specified graphically in Business Process Editor 511 and some are user defined Business Methods not derivable from information entered into Business Process editor 511. Still other Business Methods are derived from the Business Class relationships specified in Object Modeler 5 as illustrated in FIG. 1.

With reference to FIG. 7, there is seen Business Method table 713. Business Method table 713 is comprised of multiple Business Methods. Among these Business Methods are "ProcValidateUser" and "ProcRegistration." ProcValidateUser and ProcRegistration refer to validate method 615 and registration method 617. As a result of the user defining validate method 615 and registration method 617 using Business Process Editor 611, the names of the methods 615, 617 appear in Business Method table 713. The gray rectangle surrounding the text "ProcValidateUser" indicates that the user has selected the first row of the Business Method table 713. As a result of the selection, the code which forms the substance of validate method 615 appears in Business Method code window 715. If code associated with validate method 615 has been previously entered into Business Method code window 715, the code will appear in Business Method code window 715. In addition, code may be added or modified by altering the contents of Business Method code window 715.

In addition to the Business Methods whose names are automatically generated based upon the inputs to the Business Process Editor 611, the present invention can generate both entries and the attendant code for other standard Business Methods. As mentioned, each attribute comprising a Business Class may have a validation Business Rule associated with it. Such a Business Rule provides logic for determining the validity of the attribute to which it is tied. However, Business Rules can only be tied to single attributes. Business Methods, on the other hand, are tied to Business Classes and, as such, may operate on one or more attributes. Because of this property, it is possible to generate a plurality of Business Methods. For example, there can be generated, and the present invention does generate, a Business Method which automatically invokes the validation Business Rules tied to each attribute in order to establish a Business Class validation.

In addition to creating standard attribute validation, the present invention is capable of generating Business Methods to perform Business Class management functions. Such functions manage the allocation of memory comprising the persistent and transient electronic data storage space which define the run-time characteristics of a Business Class. As illustrated in FIG. 1 and discussed above, SalesOrder 21 has a one-to-many relationship with SalesOrderItem 25. That is to say that one SalesOrder 21 may have a plurality of SalesOrderItems 25. While not illustrated herein, it is likewise possible that each SalesOrderItem 25 could have a one-to-many relationship with another Business Class. If, while executing the Business Process comprising the SalesOrder Business Class, it becomes necessary to abort the processing of a sales order, it is preferable to be able to delete all the dependent instances of Business Classes which have been created and are in existence. It is therefore one aspect of the present invention to automatically generate for each Business Class the Business Methods required to handle the deletion of dependent Business Classes and their attendant data.

The present invention allows the user to define each Business Class as being of type "restrict" or type "cascade." If a Business Class is of type "cascade," the run-time embodiment of the Business Class, when no longer valid, will propagate the requirement of deleting dependent Business Classes. As each dependent Business Class may itself comprise further dependent Business Classes, the deletion logic will propagate in tree like fashion from the original Business Class to the last Business Class or Classes dependent thereupon. If, conversely, a Business Class is of type "restrict," the run-time embodiment of the Business Class, when no longer valid, will not proceed to extinguish itself if there are existing Business Classes dependent thereupon.

Figure 8:
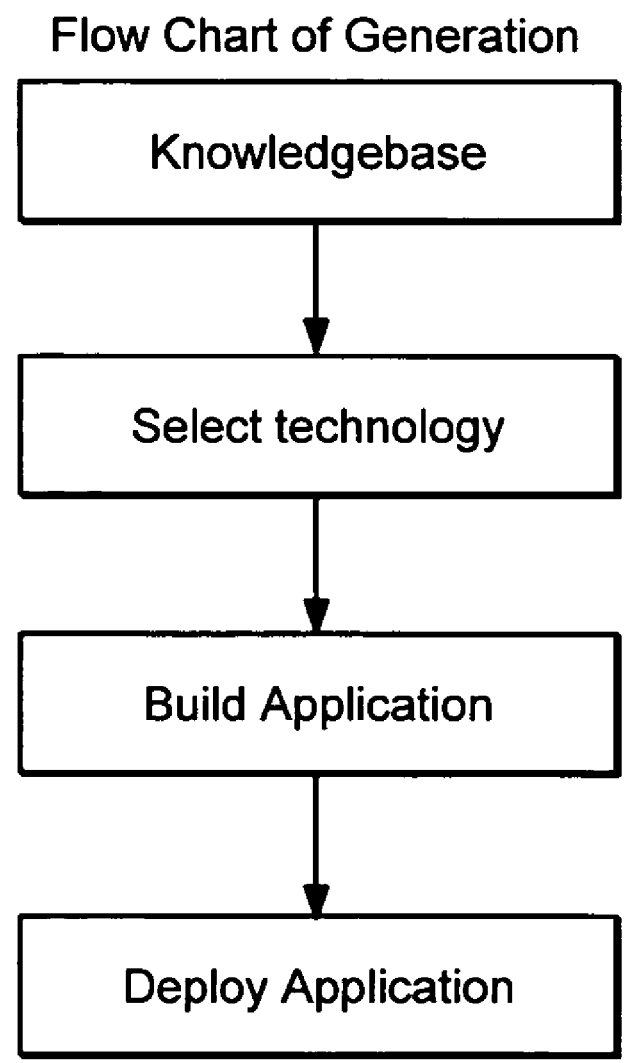
FIG. 8 is a flow chart of the code generation process of the present invention.

The present invention automatically generates Business Methods for each Business Class to allow for the management of Business Class deletions. The generation process flows sequentially from the repository in which are stored the Business Classes comprising an application to the run-time components capable of deployment throughout the architecture on which they are to run. The Business Class definitions residing in the repository form an integrated description of the business model referred to as a knowledge base. Once the knowledge base is created, technology choices, or selections, are inputed to direct the generation of individual run-time components. For example, a user might designate the generation of C++ code and JAVASCRIPT code to be generated for distribution to different platforms. Once the technology is selected, the present invention proceeds to translate the neutral code of the Business Classes into the designated technology specific language thus building the completed run-time application which forms the output of the present invention. In addition, the process of building the application may include the additional step of compiling the generated run-time components to create executable code. After building the application, the generated and executable components are deployed to the platforms upon which they will execute. This process of code generation is graphically depicted in flow chart form with reference to FIG. 8.

The code comprising each such Business Method is generated for inclusion by the user into other Business Methods. The generated code allows for the deletion of both the persistent and the non-persistent, or transient, data which comprises a Business Class. As noted, a Business Class forms the template for a particular run-time Business object. The Business Object is an instance of the Business Class.

A Business Object, when implemented in computer code forming the run time manifestation of the Business object, comprises persistent and transient representations. For example, there may exist an instance of the SalesOrder Business Class representing an actual run-time sales order. This sales order Business Object, comprising attributes and the attendant functionality required to implement the defined Business Processes and Business Rules, is located in a defined portion of memory in an electronic storage device. This portion of memory may consist of, but is not limited to, the RAM memory of the user's computer. This memory space is likely comprised of contiguous memory addresses and may be allocated and de-allocated as required by the operating system on the user's computer. While the values stored in the memory space comprised of the structure of the sales order Business Class may change, the amount of memory initially allocated is unlikely to do so. For example, when a derivation Business Rule associated with an attribute of a Business Object is invoked, the resulting value is stored in the corresponding attribute variable of the Business Object. While the value in memory may be changed by such an operation, the amount of memory space is unchanged. If the entire memory space containing the structure of the individual Business Object were de-allocated, as when the Business Object is deleted, the Business Object would cease to exist.

However, there is additionally data associated with a Business Object that may persist even after the memory space comprising the Business Object is de-allocated. For example, a SalesOrder Business Object may keep track of the sales items of which it is comprised by storing tabular information in a relational database or other suitable data storage medium. When the transient memory space comprising the Business Object is de-allocated, this tabular data will persist. In many instances, it is the tabular data associated with a Business Object that is most important to delete when the instance of the Business Object is no longer required. Therefore, the present invention automatically generates Business Methods to de-allocate the memory storage space comprising the transient Business Class data as well as those necessary to delete the non-persistent data. Examples of the later Business Methods may include, but are not limited to, SQL statements.

In addition to the aforementioned methodologies for entering Business Rules and Business Methods, the present invention provides a methodology for defining and generating web pages in a fashion which is fully integrated with the definition of other Business Class attributes.

Figure 9:
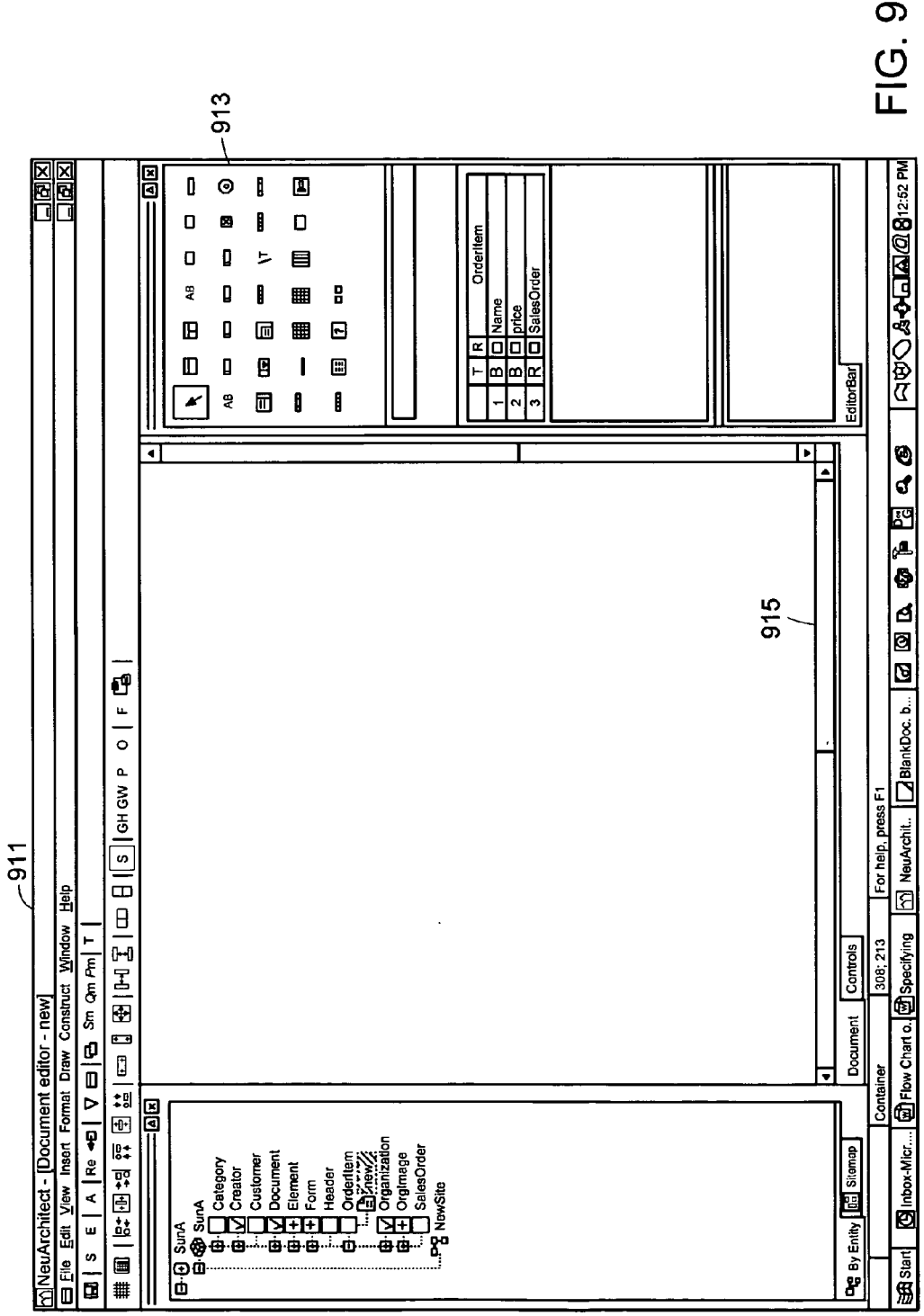
FIG. 9 is a screen rendering of the web page editor of the present invention.

With reference to FIG. 9 there is illustrated the GUI comprising, in part, web page editor 911. Web page editor 911 consists of web page space 915 representing the space upon which graphic and textual elements may be added so as to design a web page. Element selection menu 913 is a collection of icons representing different graphic and textual elements. As shall be more fully illustrated below, elements selected from element selection menu 913 can be selected and placed upon web page space 915 to design and define the layout of a web page.

Figure 10:
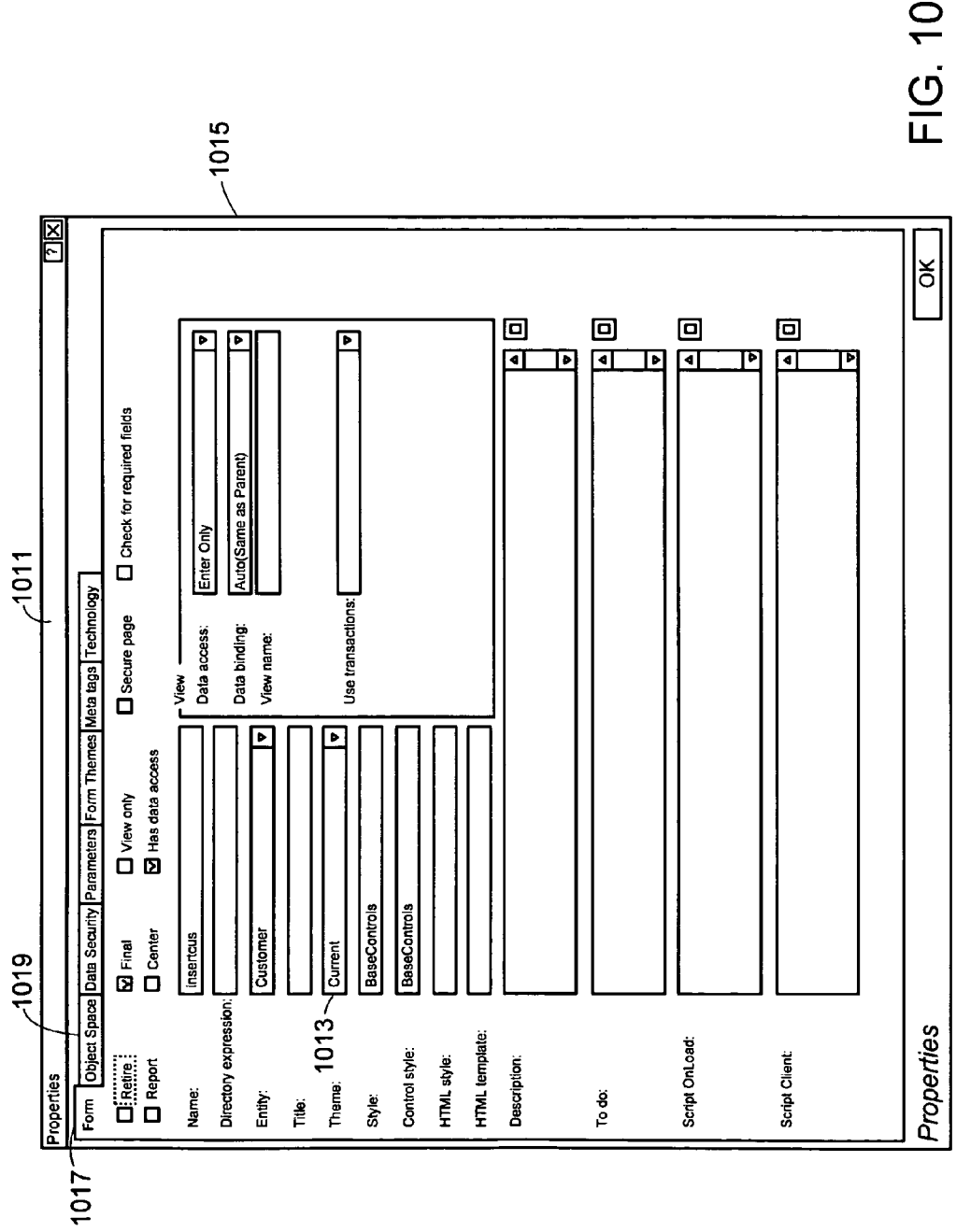
FIG. 10 is a screen rendering of the web page property editor of the present invention showing the form specified attributes.

After entering web page editor 911, the present invention allows definition at the micro and macro levels of the attributes which define the web page as a whole and each graphic or textual element individually. Referring to FIG. 10, there is illustrated web page properties editor 1011. Web page properties editor 1011 may be invoked from the web page editor 911 of FIG. 9 in any of a number of appropriate manners including, but not limited to, clicking on a push button or selecting a tab.

Once web page properties editor 1011 is invoked, there is provided a series of tabs such as form tab 1017 and object space tab 1019. In the present example, form tab 1017 has been selected and as a result a series of entry fields are displayed into which customizing data relating to the web page can be entered. Selecting any of the tabs will invoke a separate window interface through which information about the web page or one of its elements may be entered. A variety of input fields, such as exemplary input field 1013, is included within web page properties editor 1019. In the present instance, there are displayed a plurality of input fields through which there can be defined a plurality of web page attributes including, but not limited to, a web page's name, title, theme, and style. While illustrated herein with a variety of specific input fields, the present invention is drawn broadly to the inclusion of any and all input fields, of any appropriate construct, which allow the definition of web page attributes. Of note is data binding input field 1015 wherein can be entered the mode by which the web page is to be created and accessed.

Figure 10A:
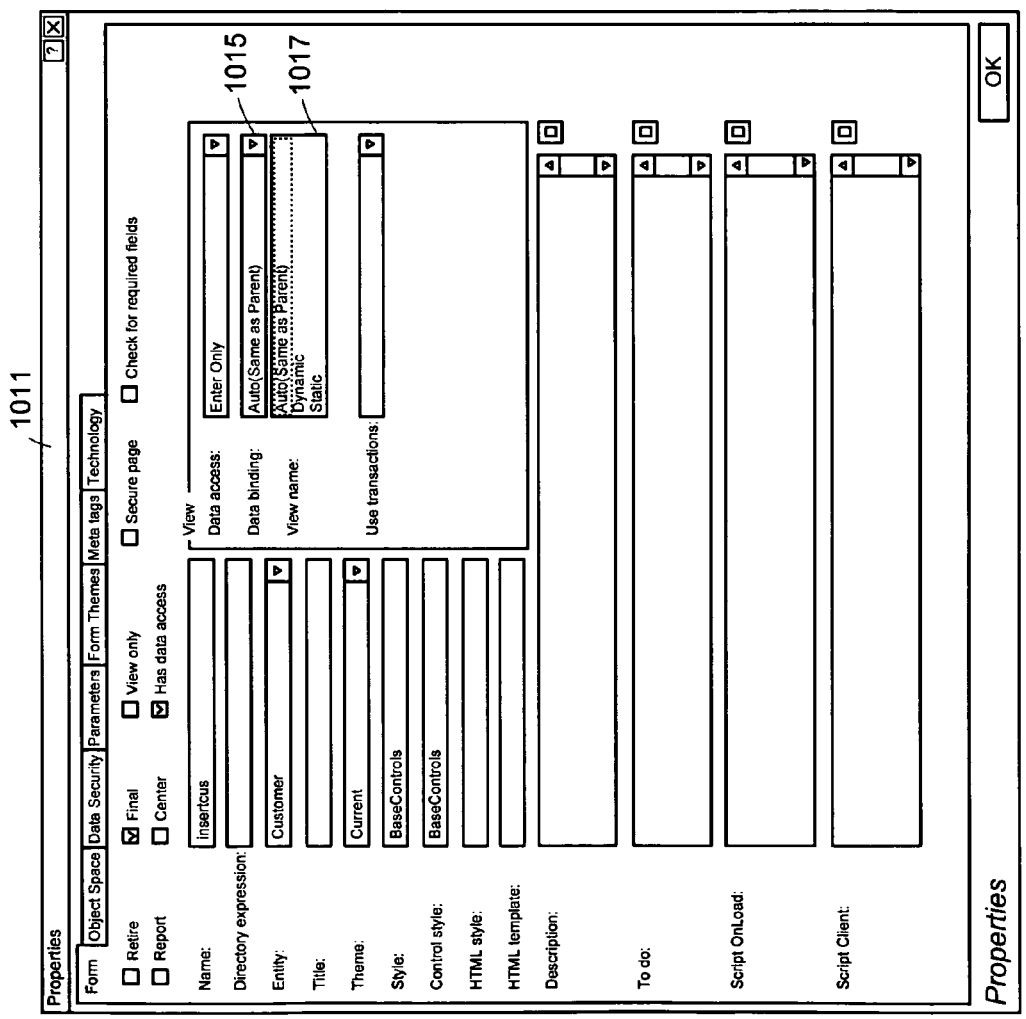
FIG. 10a is a screen rendering of the web page property editor of FIG. 10 illustrating the data binding menu.

With reference to FIG. 10a, there is illustrated data binding input field 1015 as a drop down list box 1017. Possible selections include "dynamic", "static", and "auto". Selection of static binding will allow the run-time architecture to dynamically update the code comprising the web page at predefined intervals allowing the web page to be stored and accessed as a static web page. Selection of dynamic data binding will provide through the generation of web page code, such as HTML code, of a web page which may be accessed through the run-time architecture. Selection of auto data binding will ensure that the web page is generated according to the same data binding option selected in the Business Class in which the web page resides.

Figure 11:
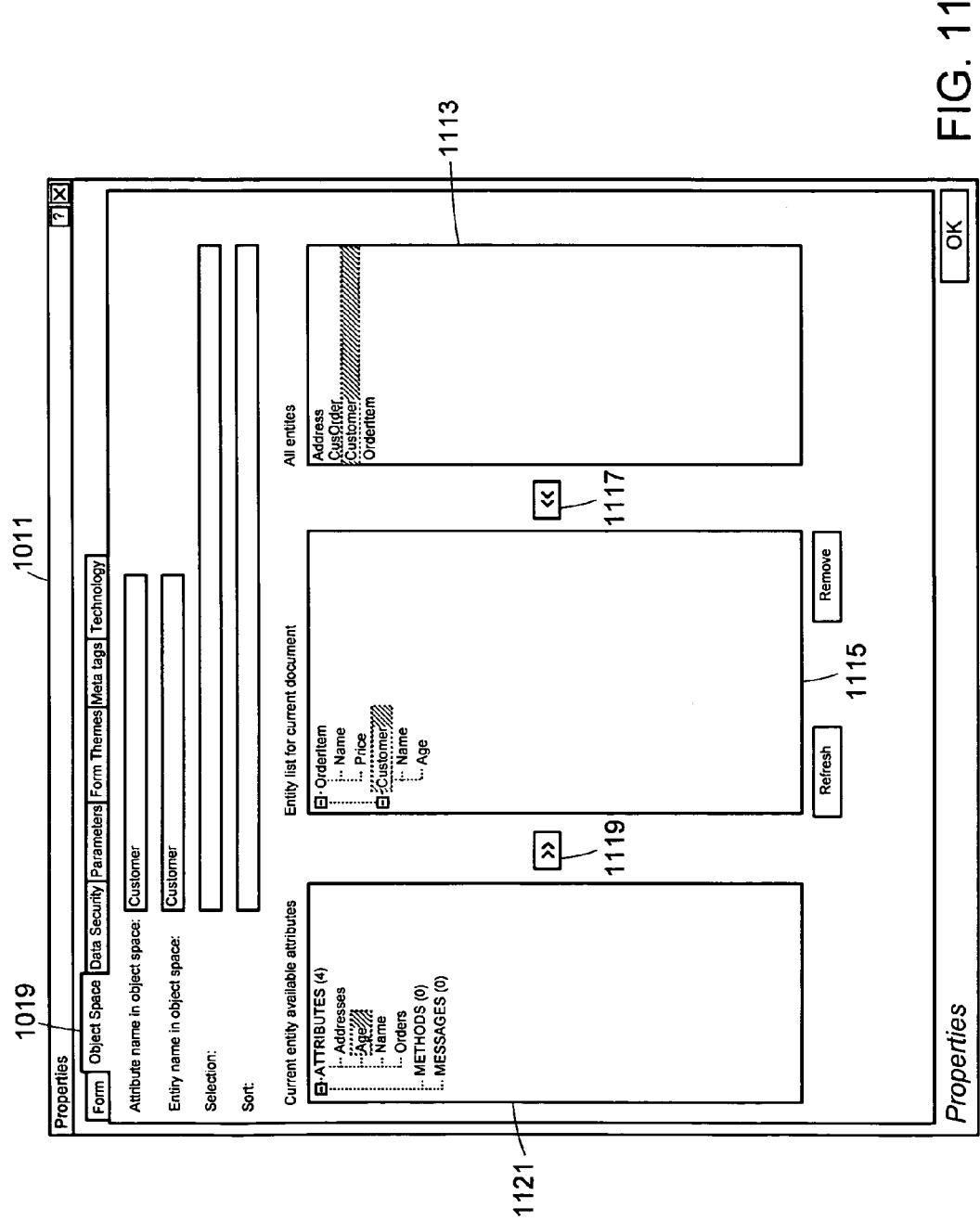
FIG. 11 is a screen rendering of the web page property editor of the present invention showing the object space specified attributes.

The present invention allows for, but does not require, the definition of the object space associated with any web page. As used herein, "object space", refers to the subset of attributes, methods, and rules contained in one or more Business Class definitions which defines the specific functionality required to perform, a discreet business function. Use of an object space obviates the difficulties inherent in web based transactions arising from the stateless nature of web based communications. With reference to FIG. 11, there is illustrated web page properties editor 1011 after selection of object space tab 1019. Displayed are entity selection window 1113, available attribute window 1121, current entity window 1115. Data is moved from one window to another through the use of add entity button 1117 and add attribute button 1119. In the present example Business Class customer has been selected and appears highlighted in entity selection window 1113. Once a Business Class has been selected, clicking on add entity button 1117 causes all of the attribute, methods and messages of the selected Business Class to appear in available attribute window 1121. Once included in available attribute window 1121, selecting an attribute, method, or message followed by clicking on add attribute button 1119 will add the selected attribute to current entity window 1115. Current entity window 115 contains all of the attributes, methods, and messages which comprise the object space associated with the web page. As used herein, a message refers to a sequence of one or more bytes of data which, like a web page definition, has an associated format and object space and may interact with other Business Classes or external code.

Figure 12:
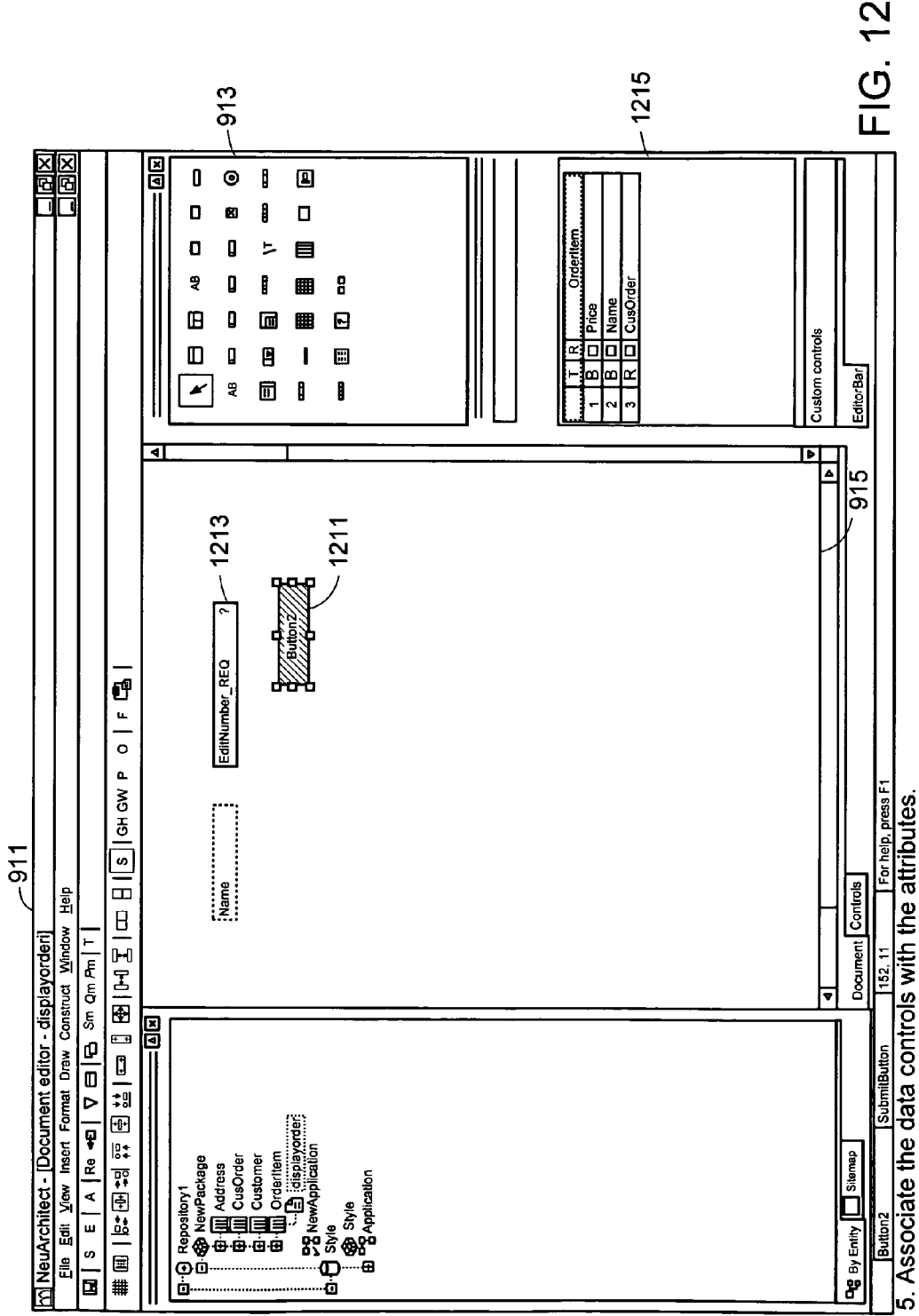
FIG. 12 is a screen rendering of the web page editor of the present invention illustrating the selection and placement of graphical and textual elements.

Whether or not an object space is defined, it is necessary to return to the web page editor 911 of FIG. 9 and to design the web page by placing graphic and textual elements on the web page and associating each element with a Business Class attribute definition. With reference to FIG. 12, there is illustrated web page editor 911 after selection and positioning of exemplary text field 1213 and button 1211 on web page space 915. One method of accomplishing such selection and positioning involves clicking on the icon in element selection menu 913 that corresponds to the element to be placed upon web page space 915 and then clicking on the desired location in web page space 915 where the chosen element is to reside. Once placed in this manner, the element, such as text field 1213 and button 1211, may be selected and moved around web page space 915 as desired in accordance with any of a number of methodologies, including but not limited to, dragging and dropping the element at a new location.

Once graphic and textual elements have been added, their properties must he defined. Note that in the present example attribute window 1215 contains data previously selected when defining the web page's object space. Through any appropriate manner of clicking on a single element in attribute list window 1215 and an element such as text field 1213, the attribute definition of a Business Class attribute may be linked to graphic or textual element on web page space 915. In this manner, information contained in a Business Class definition is automatically linked to the web page element. As mentioned, while an object space may be defined for web page before adding elements to the web page space 915, it need not be predefined. In the present example, the specialized attributes which define the operation of a web page element may be entered without reference to an existing Business Class. In the present invention, one may invoke a control properties window to enter data particular to a specific element or control.

Figure 13:
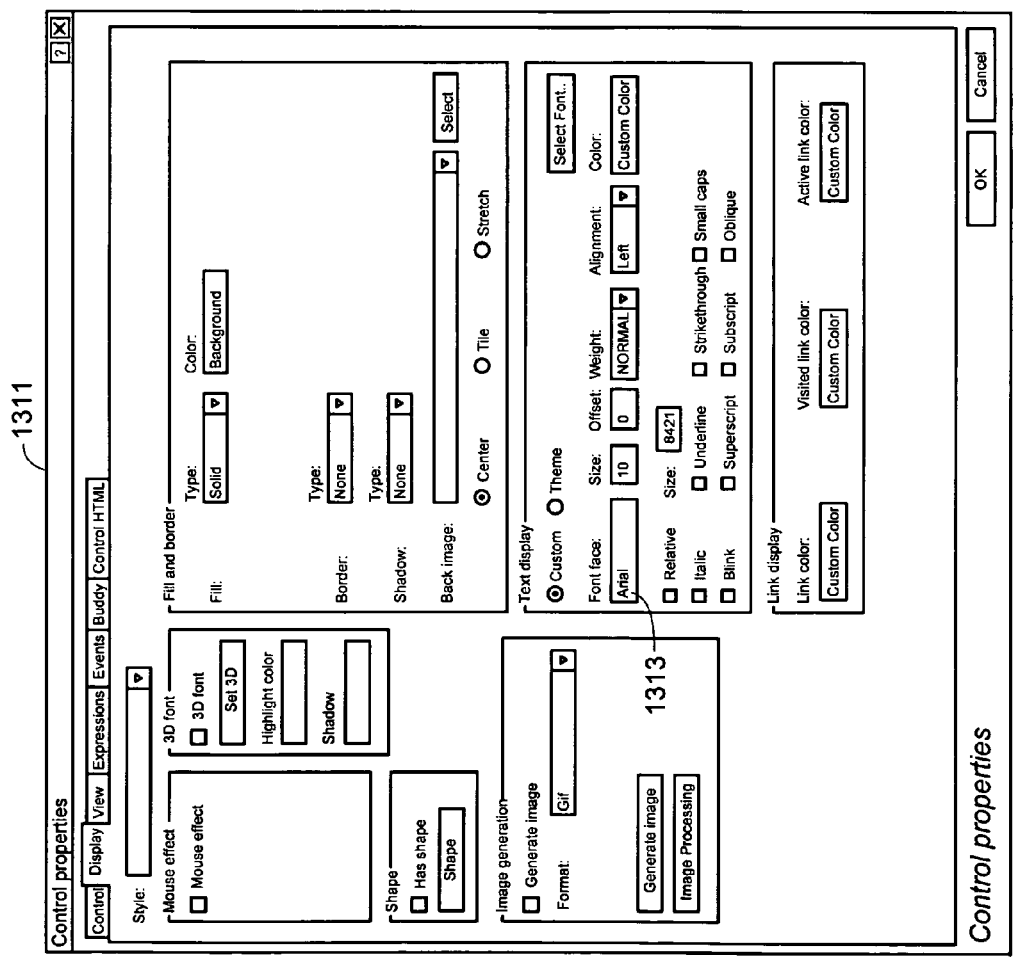
FIG. 13 is a screen rendering of the control property window or the present invention.

With reference to FIG. 13, there is illustrated the control property editor of the present invention. Invoked by the selection of an element placed in web page space 915 of FIG. 9, control property window 1311 allows for the entering of attributes which define the appearance and operation of an element. For example, control property window 1311 is comprised in part of exemplary entry field 1313 into which a font type is entered. The present invention is drawn broadly to any and all assemblages of entry fields or other data entry elements through which the appearance and operation of any and all types of graphic or textual elements may be defined.

Figure 14:
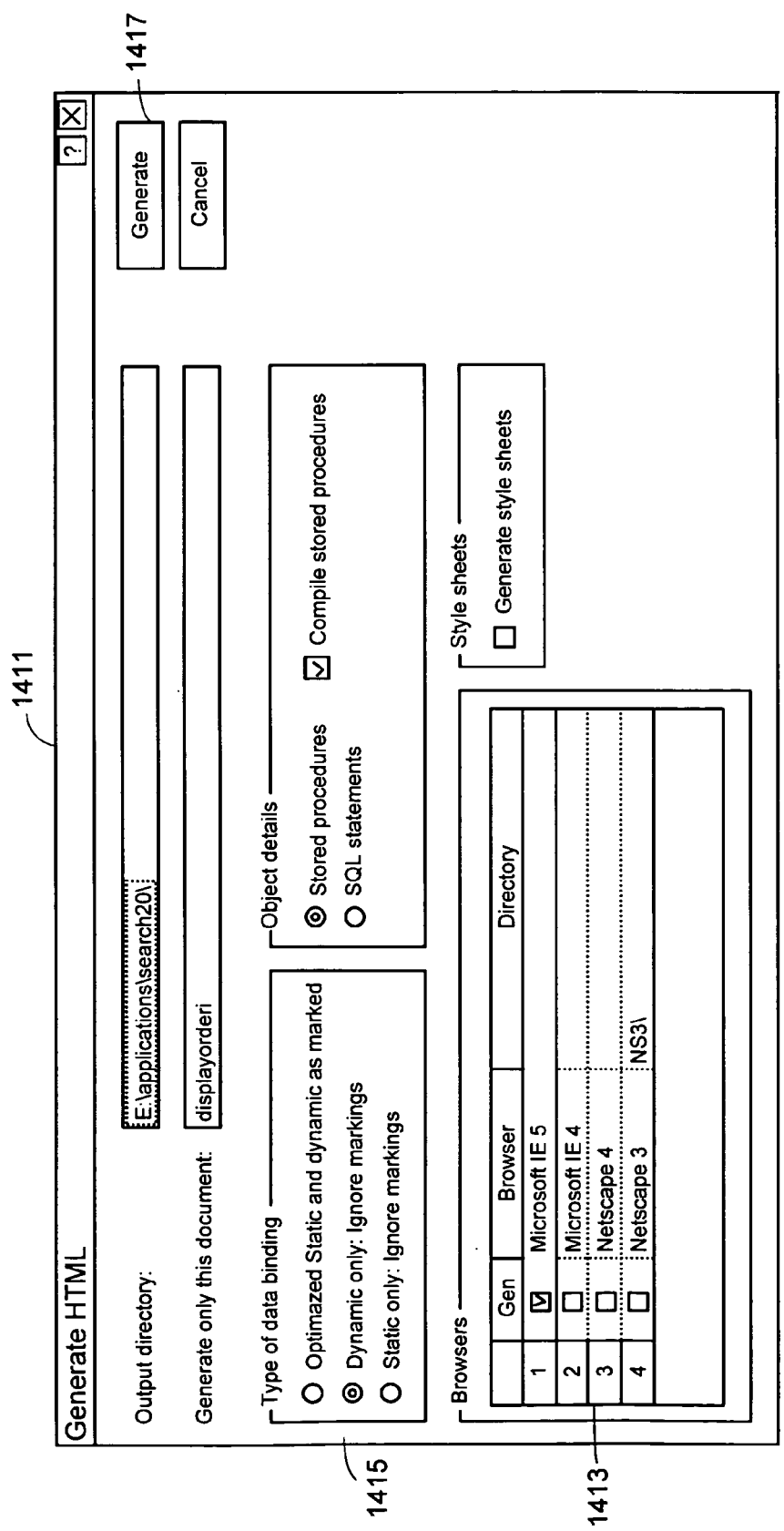
FIG. 14 is a screen rendering of the generate HTML window of the present invention.

Once the attributes of the web page and each element of the web page have been defined, the code for each web page may be generated. With reference to FIG. 14, there is illustrated generate HTML window 1411. While illustrated with reference to generating HTML code, the present invention is drawn broadly to the generation of any and all web based programming languages. Generate HTML window 1411 includes data binding selection 1415 and target browser 1413.

Once the method of data binding is selected through the use of data binding selection 1415 and the target browser is selected through the use of target browser 1413, clicking on generate button 1417 will cause the web pages defined by the present invention to be generated into run-time code reflecting the defined appearance and functionality of the web pages so defined.

Analytical reporting features are provided through the use of OLAP technologies. OLAP engines and reporting tools provide a multi-dimensional view of data and are optimized for fast aggregation. OLAP tools support commonly used methods of analysis such as drill down on summary data, pivoting and rotating the data in spreadsheets, and filtering data on one or more dimensions.

Figure 15:
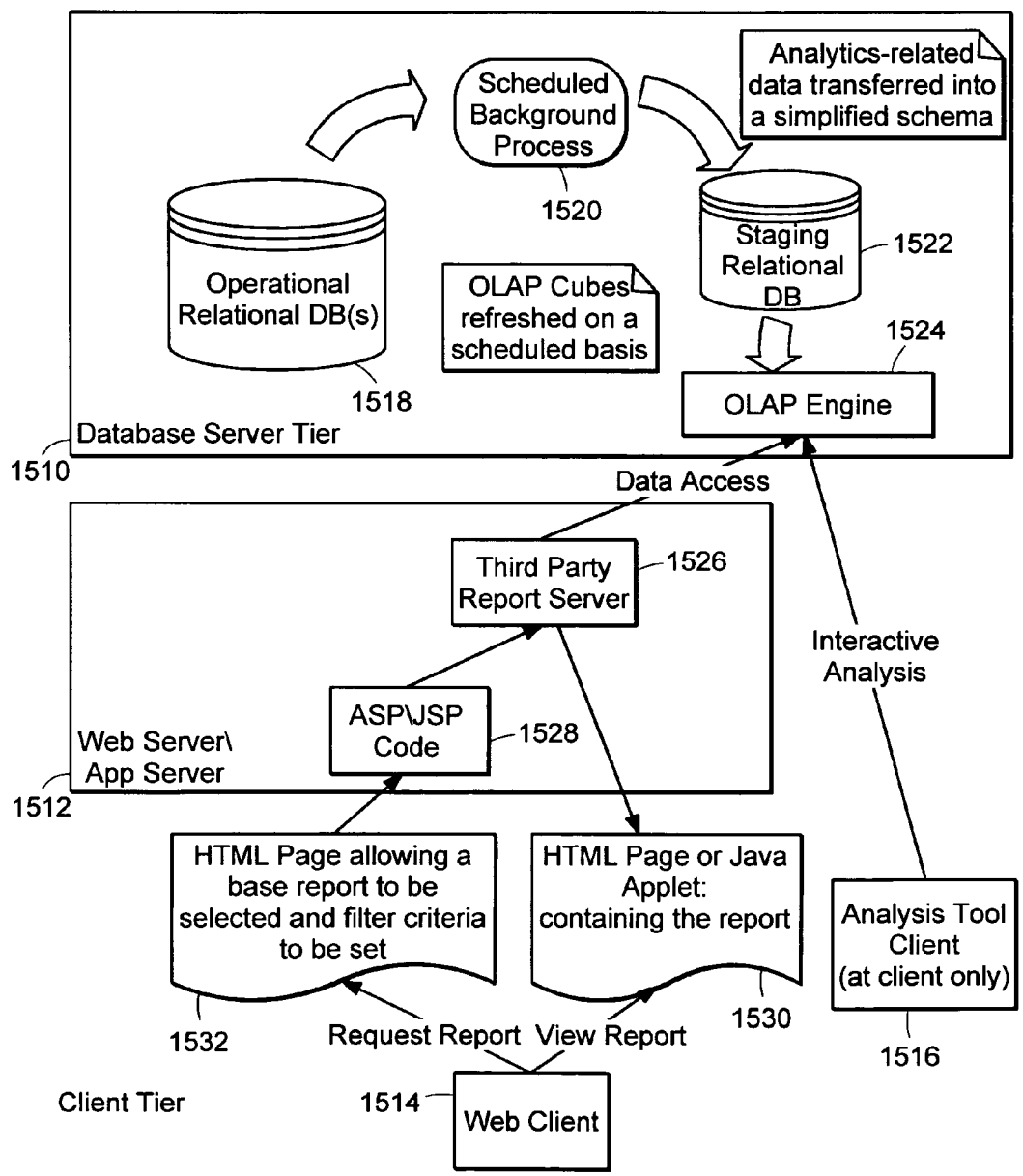
FIG. 15 is a schematic diagram of the present inventions architecture.

With reference to FIG. 15 there is illustrated one configuration for implementing the architecture of the present invention. Run-time architecture 151 is comprised of database server tier 1510, web server\application server 1512, web client 1514, and client analysis tool 1516. Focusing on the data portion of run-time architecture 151, database server tier 1510 is comprised of operational relational database 1518, scheduled background process 1520, staging relational database 1522, and OLAP engine 1524.

Operational relational database 1518 is a centralized storehouse of electronic information containing data which facilitates the operation of a business' application executables. While illustrated in the present instance as a singular entity, run-time architecture 151 may comprise a plurality of operational relational databases existing on a plurality of platforms which may be geographically dispersed. Communication between the plurality of relational databases may be established through various methods of connectivity including, but not limited to, internet or wireless modes of communication. In addition, while illustrated as a relational database, operational relational database 1518 may take the form of any data repository to which data may be added and from which data may be retrieved.

Staging relational database 1522 is a centralized storehouse of electronic information containing a subset of the data contained within operational relational database 1518. While illustrated in the present instance as a singular entity, run-time architecture 151 may comprise a plurality of staging relational databases existing on a plurality of platforms which may be geographically dispersed. Communication between the plurality of staging relational databases may be established through various methods of connectivity including, but not limited to, internet or wireless modes of communication. In addition, while illustrated as a relational database, staging relational database 1518 may take the form of any data repository to which data may be added and from which data may be retrieved.

Scheduled background process 1520 is in the form of executable code residing on a platform which possesses connectivity to both operational relational database 1518 and staging relational database 1522. As will be detailed below, the present invention automatically generates the code which comprises scheduled background process 1520. Such a background process 1520 could take the form of a series of SQL queries. The code comprising scheduled background process 1520 is automatically generated so as to be compliant with the operating system under which it is executed and to interface through the execution of appropriate commands with operational relational database 1518 and staging relational database 1522. Because the software comprising both operational relational database 1518 and staging relational database 1522 may change over time or differ from similar databases running simultaneously on different platforms, the present invention automatically generates code which is specifically tailored to interface in an appropriate manner with any and all databases with which it communicates. As a result of the execution of scheduled background process 1520, there is created and maintained upon staging relational database 1522 a schema comprised of a subset of the data contained within operational relational database 1518 and compliant with the requirements of OLAP engine 1524.

OLAP engine 1524 is any of a plurality of applications commonly utilized to provide OLAP capabilities. As noted above, OLAP engines and reporting tools provide a multi-dimensional view of data and are optimized for fast aggregation. OLAP tools support commonly used methods of analysis such as drill down on summary data, pivoting and rotating the data in spreadsheets, and filtering data on one or more dimensions.

To facilitate user interaction with OLAP engine 1524, there is both web client 1514 and client analysis tool 1516. Web client 1514 forms the client component complimentary to the database server tier 1510 server. As used herein, "web client" refers to a client application or interaction communicating via an internet connection or other connection facilitating access to the world wide web. Interposed between web client 1514 and database server tier 1510 is web server\app server 1512. Web server\app server 1512 is comprised of report server 1526 and Active Server Pages (ASP)\JSP code 1528. Report server 1526 consists of any of a number of commercially available software packages that interface with an OLAP engine to access data therefrom. One example of a suitable report server 1526 is Crystal Reports from Seagate Software of Scotts Valley, Calif. ASP\JSP code 1528 interfaces with report server 1526 and HTML request page 1532. HyperText Markup Language (HTML) is a language used for creating documents on the world wide web including provisions for including pictures and links to other web pages. HTML request page 1532 invokes ASP\JSP code 1528 with the information required to identify and extract a base report based upon included filter criteria. Exemplary filter criteria include, but are not limited to, timeframes, particular products, particular customers, and particular vendors. ASP\JSP code 1528 passes this request along to third party report server 1526. Report server 1526 then interfaces with OLAP engine 1524, extracts the requested information and send the retrieved data to HTML view page 1530.

Both HTML view page 1530 and HTML request page 1532 interface with web client 1514. while the present description of HTML request page 1532 and HTML view page 1530 are implemented in HTML code, they could be formatted in any manner capable of providing web client 1514 with a visually accessible representation of the underlying data provided to and returned from OLAP engine 1524 via web server\app server 1512.

Web client 1514 consists of a web browser such as Internet Explorer by Microsoft Corporation of Redmond, Wash. Web client 1514 permits a user access to metric data through a web interface. Similarly, client analysis tool 1516 allows a user direct connectivity to OLAP engine 1524. Client analysis tool 1516 may comprise any of a number of commercially available applications including Crystal Reports by Seagate Software of Scotts Valley, Calif. Through the use of either web client 1514 or client analysis tool 1516, a user may access metric data and perform analysis by interfacing with OLAP engine 1524.

Analytics support in the present invention is focused on the analysis of a plurality of data types. One type of data consists of numeric attributes defined for a business entity. An example of this might be a "total amount" attribute on an "Order" Business Class. This would provide a basis for analyzing Order Amounts in relation to Business Classes and other data involved in Order processing.

Another type of analysis data supported by the present invention consists of the durations of time between the states in a business process. As used herein, a "state" refers to the logical status of a discreet business function which may, but is not necessarily, captured by an enumerated data type. Analysis of such data will allow a user to request reports to compare the time between steps in a process based on related factors such as time (year, quarter, month, season, etc.), geography of a customer or vendor (country, state, city, etc.), category of product, sales region. etc.

The Object Modeler of the present invention provides a graphical user interface (GUI) through which a user can define all of the information required to define the attributes of a Business Class. Because the present invention records information about attribute data types and the relationships among attributes of a particular Business Class in a centralized repository, it is possible for a user to identify a plurality of attributes for metric analysis on a Business Class by Business class basis.

Figure 16:
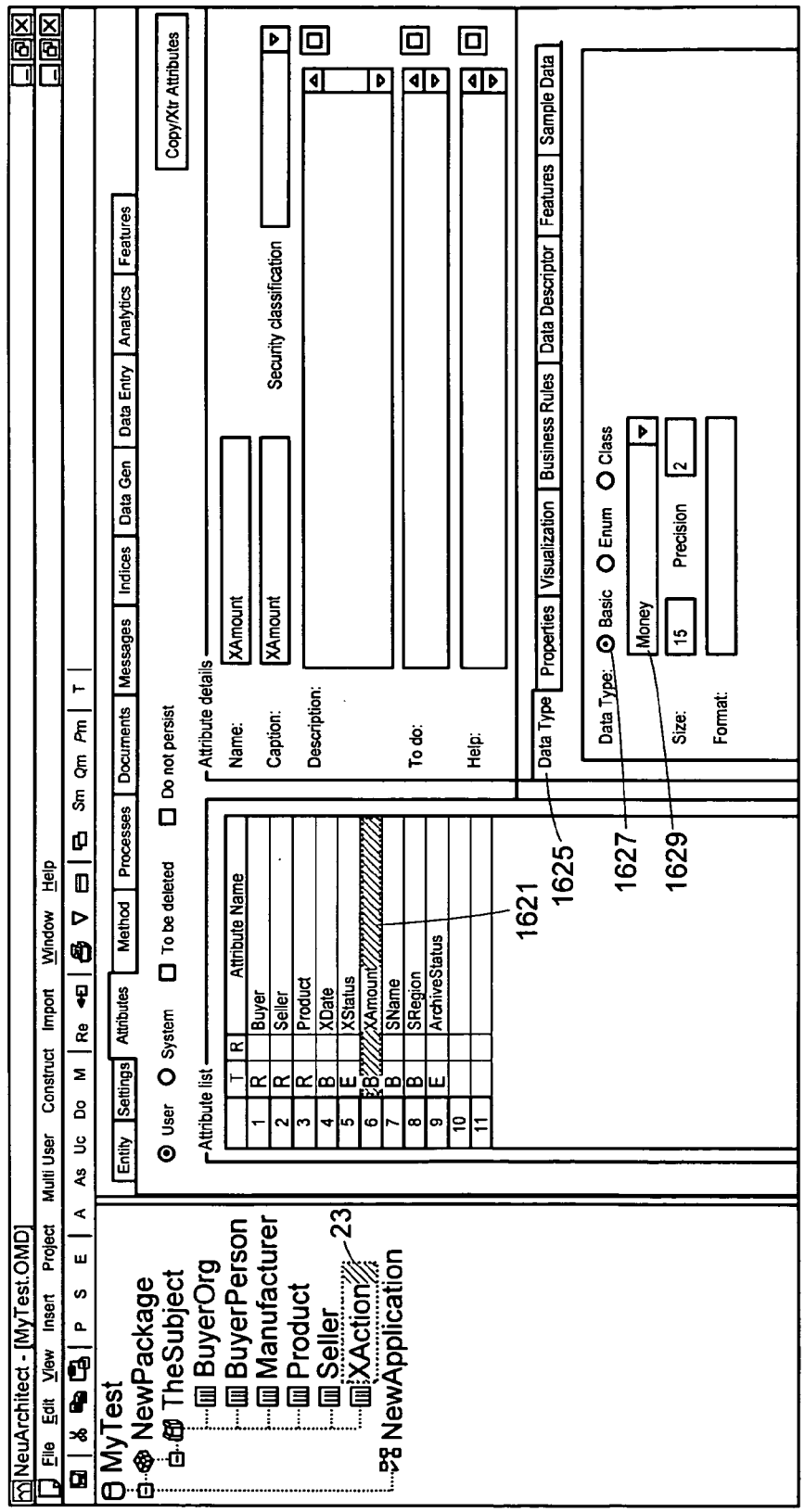
FIG. 16 is a screen dump of the Object Modeler of the present invention illustrating attribute definition.

With reference to FIG. 16, there is illustrated an initial screen of a GUI through which a user may select a numeric attribute for metric analysis, The GUI of the present invention is integrated into the Object Modeler through which Business Classes are defined. However, the present invention is broadly drawn to include the specification of data objects upon which metric analysis is to be performed through any and all interactive means. In the present example, XAmount 1621 was previously defined as an attribute through the use of the Object Modeler and shown highlighted to indicate that it has been selected by the user. Numerous methods for selecting and manipulating graphic objects displayed on a GUI are known such as drag-and-drop and various point-and-click methodologies. While the present invention makes use of hot keys, single cursor clicking, and double cursor clicking to select and manipulate graphic objects, the present invention is not limited to any particular methodology. Rather, the present invention broadly encompasses any and all methodologies for selecting graphic objects.

When XAmount 1621 is selected, it appears as grayed. Clicking on data type tab 1625 causes information on XAmount 1621 to be displayed. Data type radio button 1627 indicates that XAmount 1621 is a basic data type. In the present example, type descriptor 1629 indicates a sub-type of "money" has been selected. Additional entry fields indicate that XAmount 1621 will have a size of fifteen and a precision of two. As such, XAmount can hold a value thirteen characters in length and accurate to one one-hundreth. Type descriptor 1629 may take additional values including, but not limited to, integer, text or float.

Figure 17:
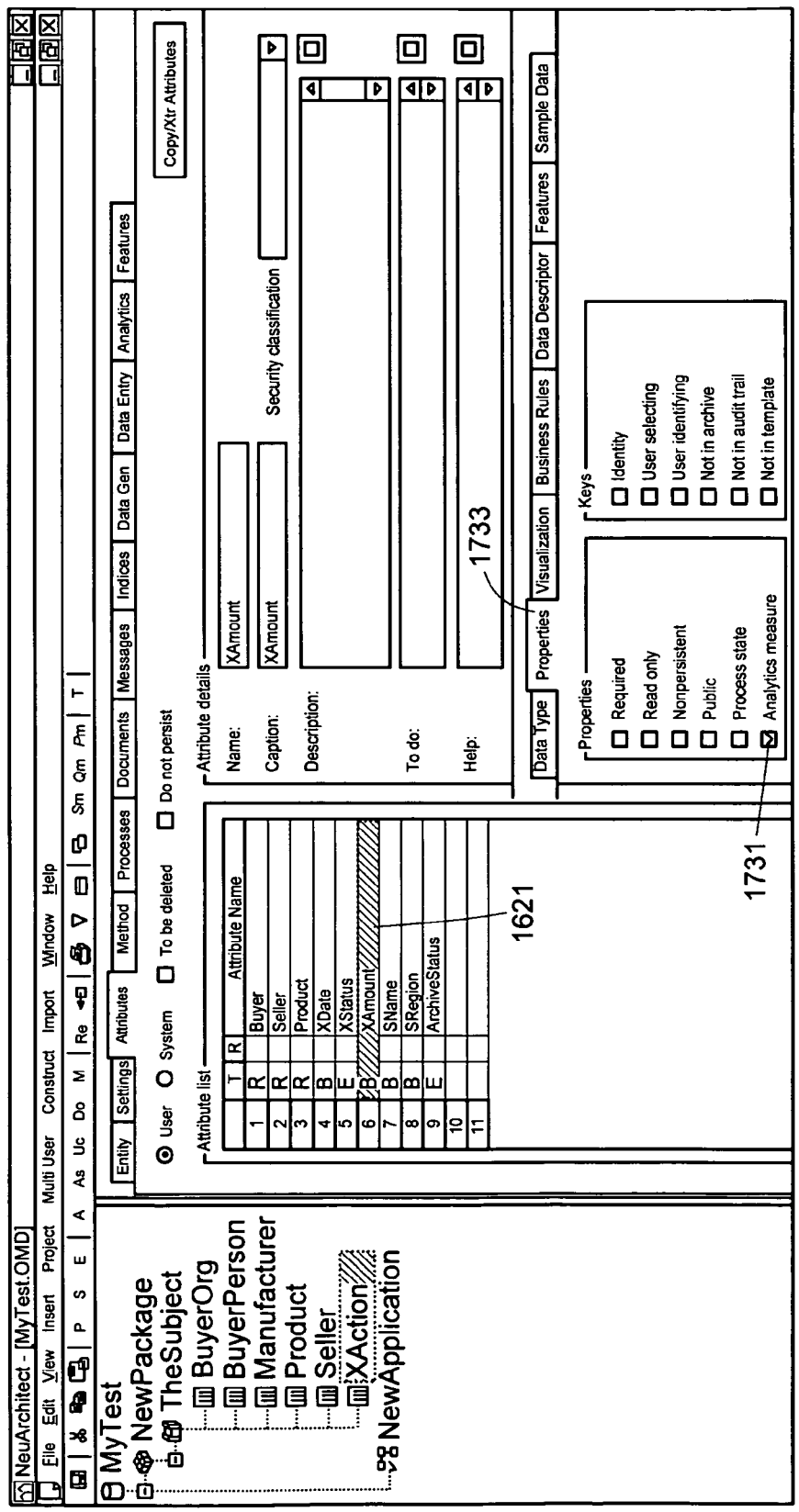
FIG. 17 is a screen dump of the Object Modeler of the present invention illustrating user selection of metric analysis.

With reference to FIG. 17, there is illustrated the methodology for defining metric analysis of an attribute. As before, XAmount 1621 has been selected and appears highlighted. In the present instance, properties tab 1733 has been selected and a series of checkboxes are displayed. By clicking on and selecting analytics measure checkbox 1731, the user has defined attribute XAmount 1621 for metric analysis.

Figure 18:
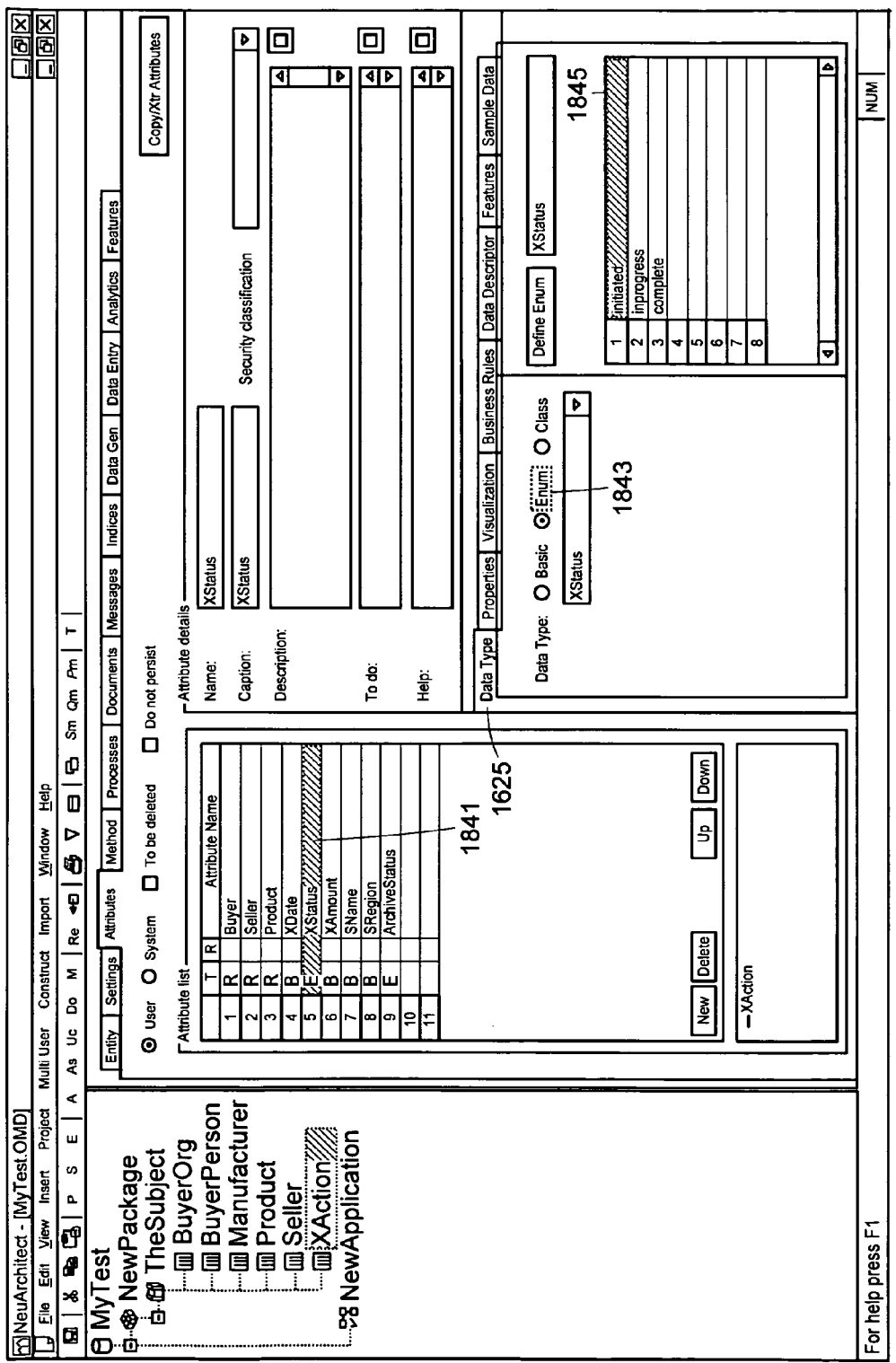
FIG. 18 is a screen dump of the Object Modeler of the present invention illustrating user definition of enumerated data for metric analysis.

As mentioned, the present invention allows for metric analysis of the durations of time between the states in a business process. With reference to FIG. 18, attribute XStatus 1841 is highlighted. When data type tab 1625 is selected, data type radio button 1843 signifies a data type of enumerated. An enumerated data type is capable of storing integer values each of which map to state definitions. As illustrated by highlighted "initiated" state 1845, the "initiated" state is mapped to integer value "1". Likewise, integer values "2" and "3" are mapped to states "inprogress" and "complete" respectively. These states may be edited. In addition, other states may be added as desired.

Figure 19:
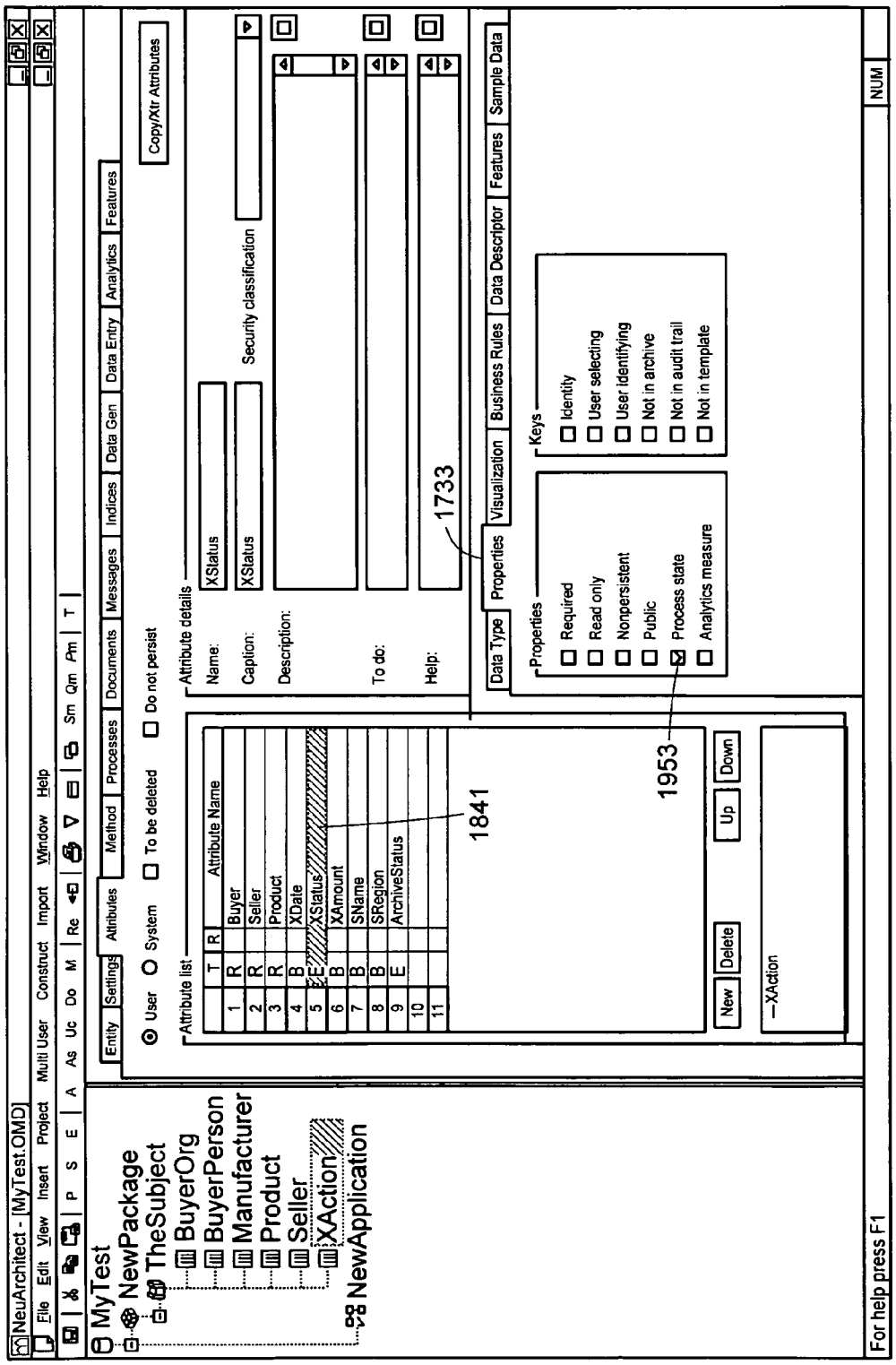
FIG. 19 is a screen dump of the Object Modeler of the present invention illustrating user selection of process state data for metric analysis.

With reference to FIG. 19, XStatus 1841 has been selected. Because XStatus 1841 is an enumerated state variable, check box process state 1953 is selected. Clicking on check box process state 1953 defines attribute XStatus 1841 as a process state.

Figure 20:
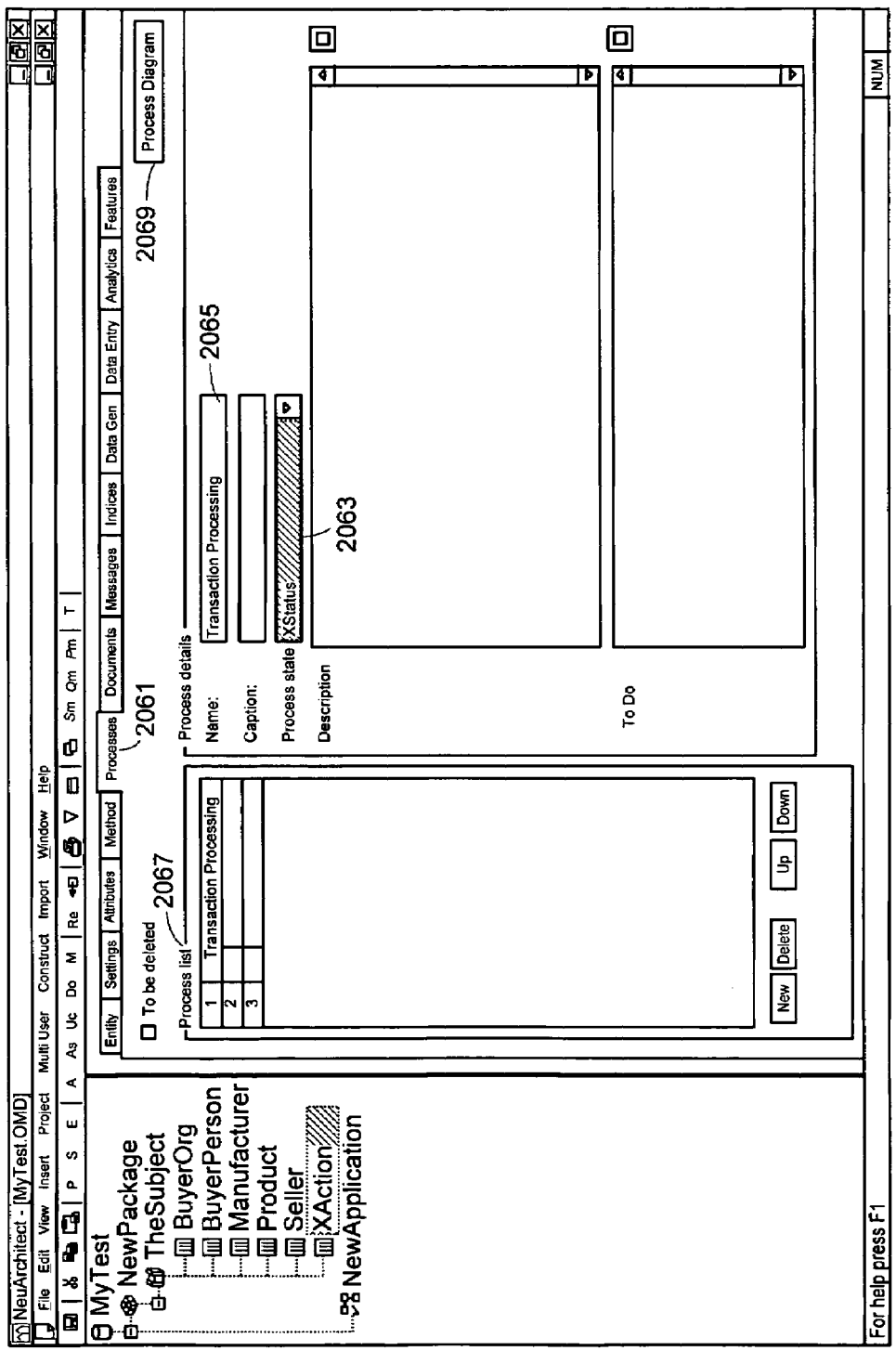
FIG. 20 is a screen dump of the Object Modeler of the present invention illustrating user association of process state with enumerated attribute.

Once an attribute, such as XStatus 1841, has been flagged as a process state, it remains to define the process that is associated with the process state attribute. With reference to FIG. 20, there is illustrated the GUI for accomplishing this task. Clicking on processes tab 2061 causes process details to be displayed. In the present example, process state XStatus 2063 has been selected from a drop down list of process states. The title "Transaction Processing" has been entered by the user to identify XStatus 1841 with a more intuitively identifiable description. As a result of entering "Transaction Processing" in name field 2065, the transaction processing process is automatically listed in process list 2067. Clicking on process diagram 2069 invokes the process modeler of the present invention.

Figure 21:
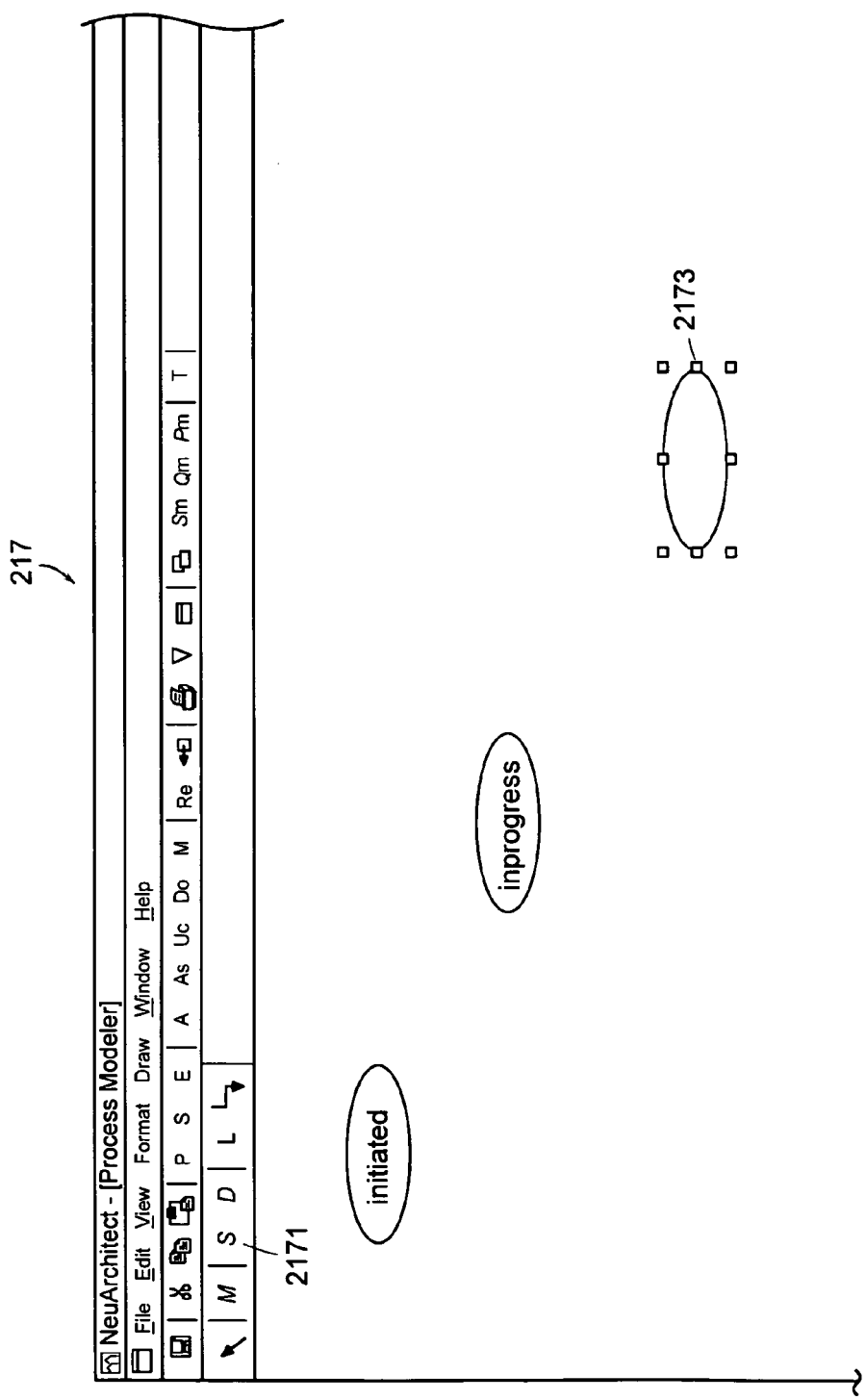
FIG. 21 is a screen dump of the Process Modeler of the present invention illustrating user definition of process states.

With reference to FIG. 21, the user may use the process modeler to diagram the interaction of a multiplicity of process states. Clicking on state button 2171 results in a state template such as state template 2173 to be plotted within Process Modeler 217. Once plotted, double clicking on any of three process states pictured will invoke state property editor 228 illustrated in FIG. 22. With continued reference to FIG. 21, process states "initiated" and "inprogress" have been plotted. After double clicking on a process state, the state property editor 228 of FIG. 22 is invoked. As is illustrated, a state may be selected from drop down state name menu 2217. In the present example, the process states defined previously appear for selection purposes. In a similar manner, next step entry field allows for the definition of the process state which logically follows from the process state being defined. Through a process of specifying subsequent logical process states individual process states are linked to form a logical process. In order to form such a logical process, one process state must be designated a start state. This is accomplished through selection of start state check box 2213. Subsequent process states may select capture time check box 2215. Once capture time check box 2215 has been selected, since entry field 2219 is activated. Since entry field 2219 allows for the selection of which process state or event it is desired to obtain the duration of time between the designated state or event and the present process state.

An OLAP database consists of cubes, similar to tables in relational databases. Cubes are made up of dimensions and measures. Dimensions have levels which make up a hierarchy. For example a time dimension may have levels for Year, Quarter, Month, and Day. An entity, such as a Business Class in the present invention, corresponds to an OLAP cube. A Business Class' attributes can be selected to provide the data for dimensions in the cube. Quite often a Business Class' relationships can be traversed to select a related Business Class and its attributes to serve as the data source of the Cube's dimensions.

For example, an Order Business Class might have related Vendor and Customer Business Classes. These related Business Classes would be selected as dimensions because each represents a factor that will be required for the analytical reports. That is, customers may want to see how vendors are performing in various regions of the country, and vendors may want to compare their own performance for customers in different industries.

OLAP measures are the units of data which need to be analyzed across the dimensions. In the present invention, the measures of the cube can be the durations between a selected set of states in the processes owned by the entity. For example, in the Order example above, the durations between the Order states might include approval time, fulfillment time, and payment time.

Figure 23:
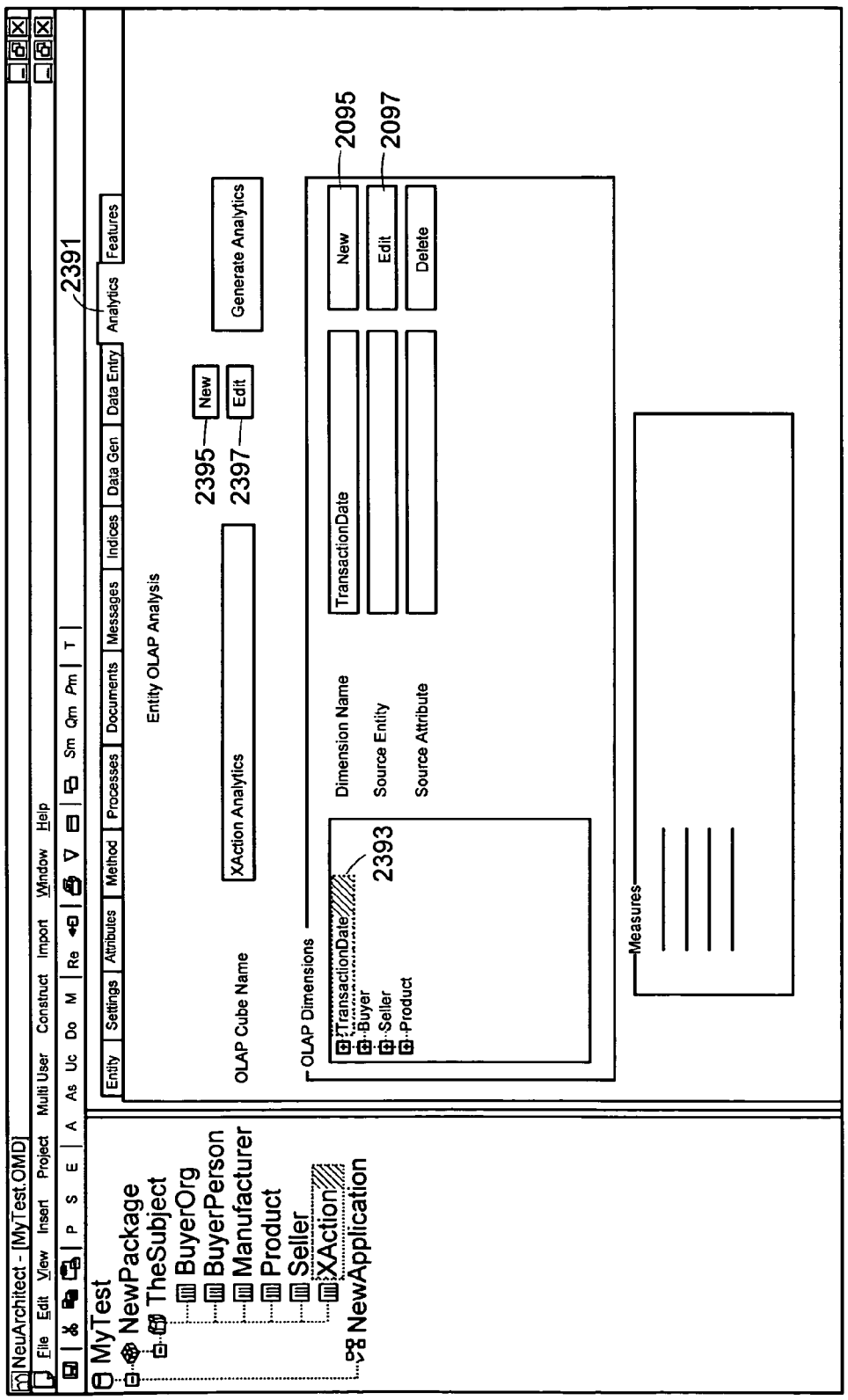
FIG. 23 is a screen dump of the Object Modeler of the illustrating dimension definition.
Figure 24:
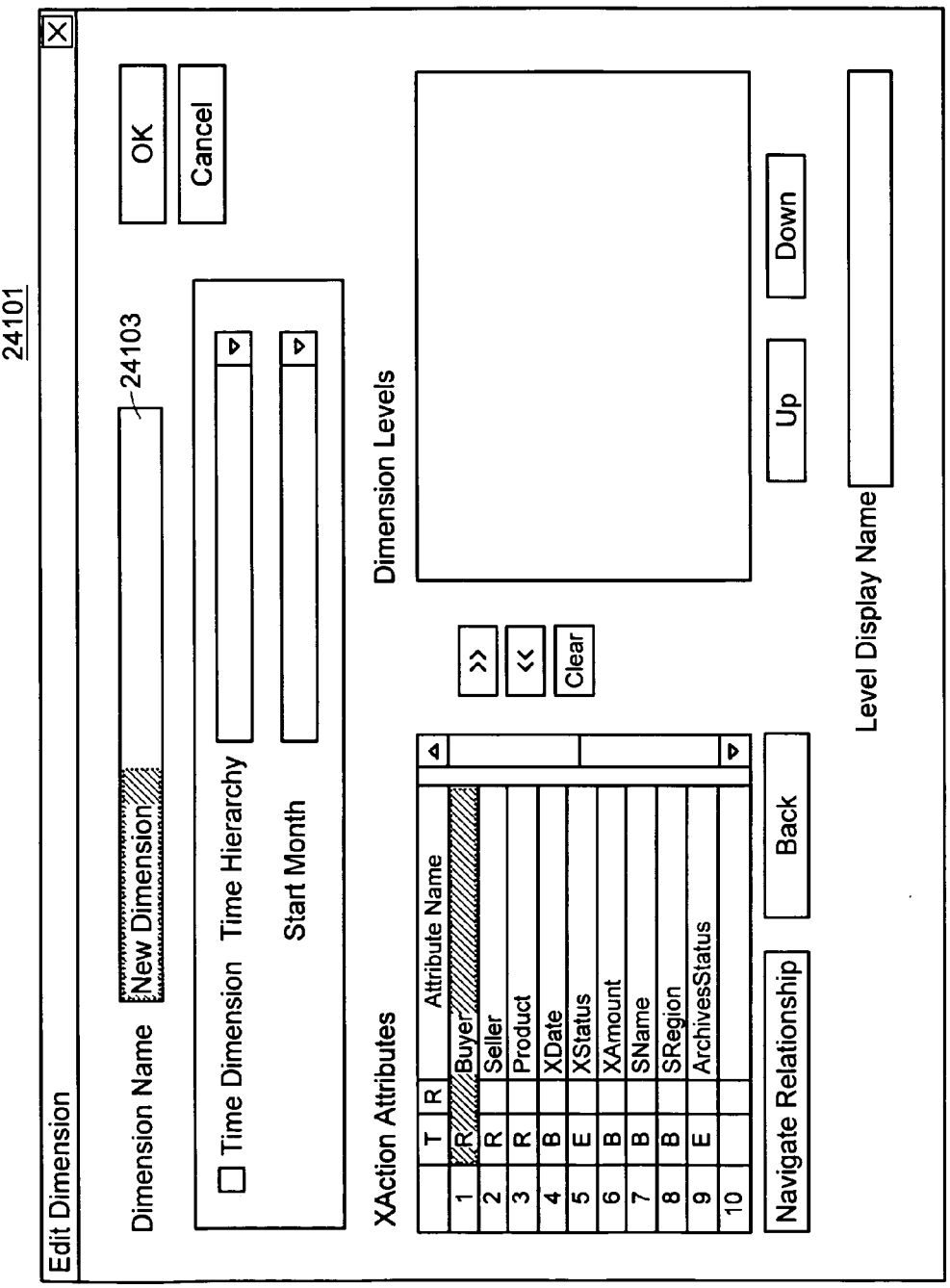
FIG. 24 is a screen dump of the Object Modeler of the present invention illustrating Business Class navigation.
Figure 25:
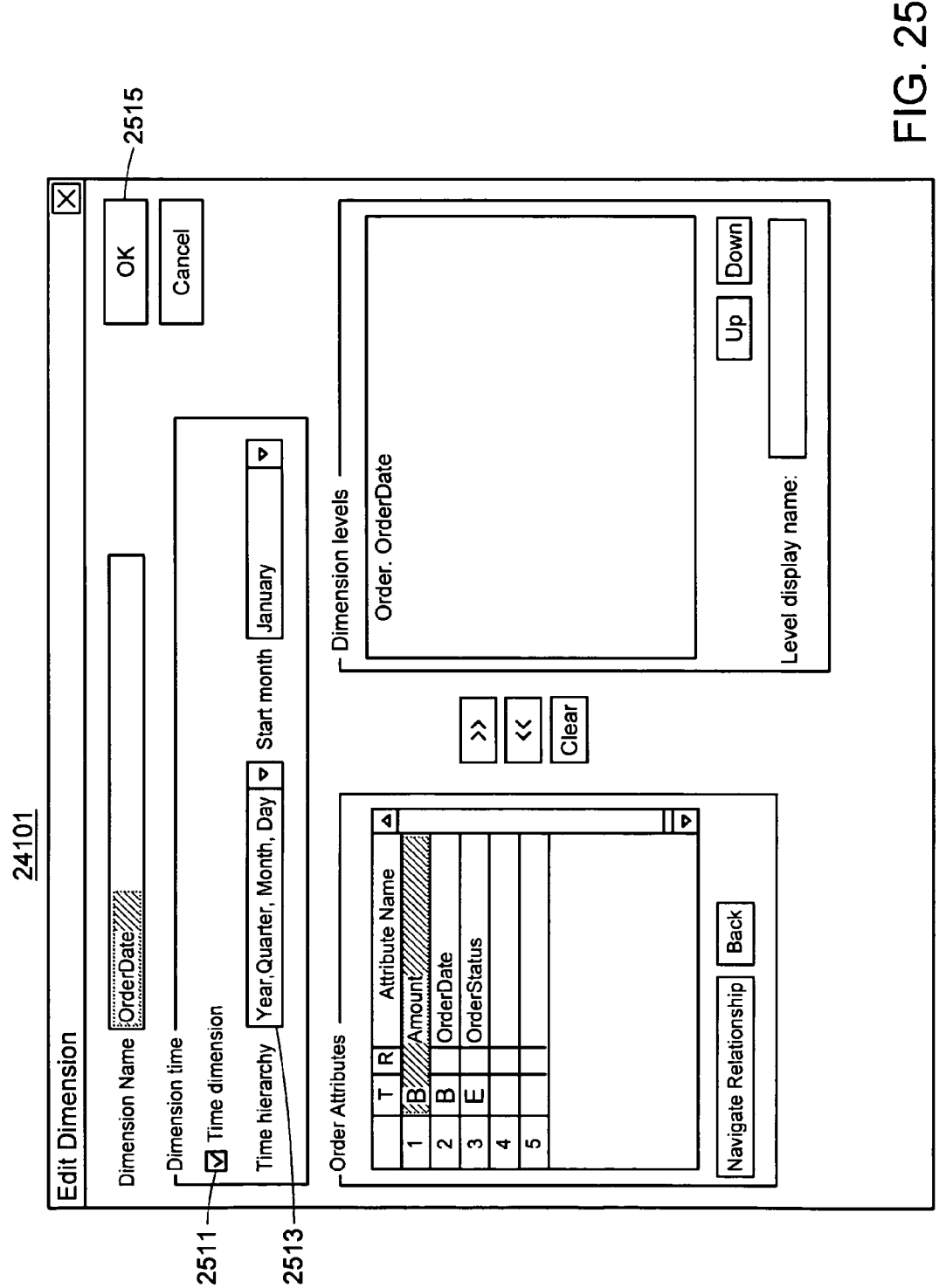
FIG. 25 is a screen dump of the Object Modeler of the present invention illustrating time dimension definition.
Figure 26:
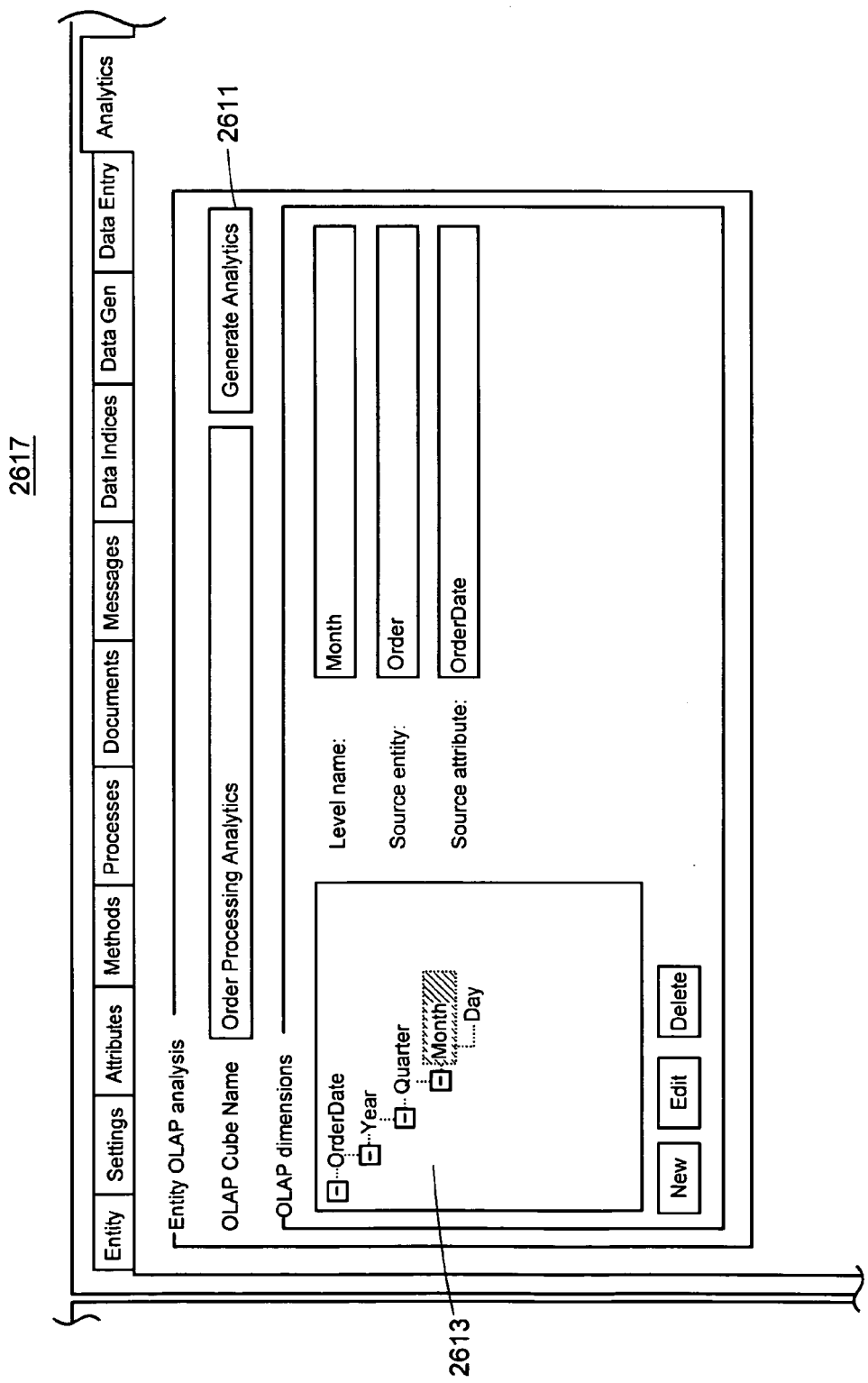
FIG. 26 is a screen dump of the Object Modeler of the present invention illustrating OLAP dimension hierarchy.

The method by which dimensions are defined in the present invention is illustrated with reference to FIG. 23. As noted, each OLAP cube is associated with a single Business Class. The present invention provides a methodology whereby a user can interact with a GUI to fully define the desired dimensions associated with the selected measures for the purposes of metric analysis. Referring to FIG. 23, analytics tab 2391 has been selected. As a result, the GUI displays OLAP and dimension related controls. Under the heading "OLAP Dimensions" TransactionDate dimension 2393 is listed amongst three other previously defined dimensions including "Buyer," "Seller," and "Product." Clicking on new button 2395 allows the user to specify a new dimension. With continuing reference to FIG. 23, a user may click on edit button 2397 to invoke edit dimension window 24101. If the dimension to be specified through the use of edit dimension window 24101 is a time dimension, it may be so specified as illustrated in exemplary edit dimension window 24101 in FIG. 25. As illustrated, time dimension check box 2511 has been selected. As a result, a default time hierarchy is displayed in time hierarchy entry field 2513. While the default time hierarchy in the present example consists of "Year,Quarter,Month,Day", any number of other hierarchies may be displayed for selection purposes. In addition, any start month may be selected to designate the month from which dimension information is to be gathered. In the present example, clicking on OK button 2515 causes the invocation of and return to analytics editor 2617. There is illustrated in OLAP dimension diagram 2613 the expanded hierarchy of dimension elements comprising dimension OrderDate as specified above with reference to FIG. 25. with continued reference to FIG. 26, there is illustrated the dimension of OrderDate which will have a year of order associated with it, the year having four quarters, each quarter comprising multiple months, and each month having multiple days. As with the designation of measures, the information specified to define dimensions is stored in a centralized repository. As a result, clicking on generate analytics button 2611 will cause the generation by the present invention of the code necessary and required to perform the desired analytic tasks.

Figure 27:
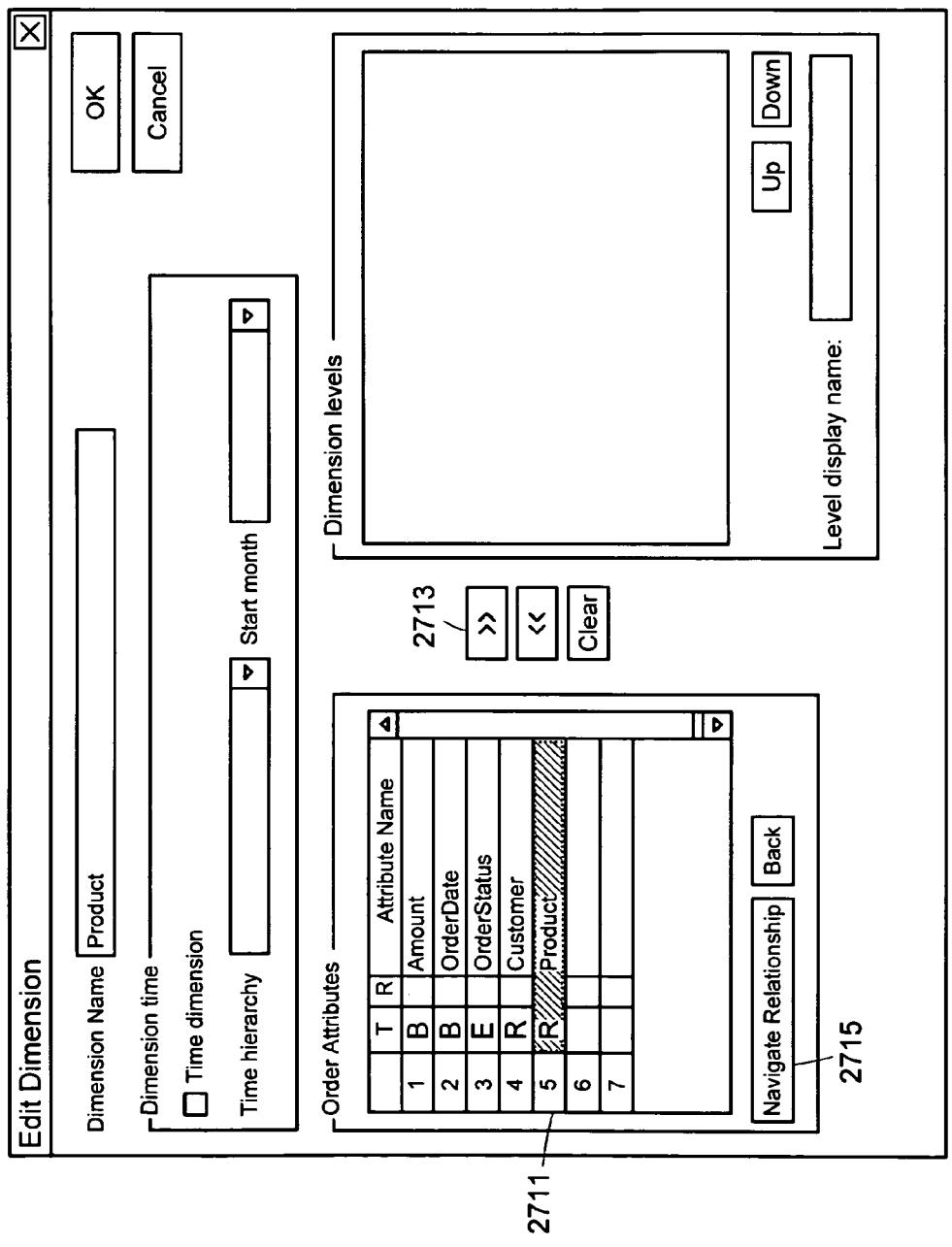
FIG. 27 is a screen dump of the Object Modeler of the present invention illustrating Business Class attribute navigation.

With reference to FIG. 27, there is illustrated the definition of an OLAP dimension which is not time dependent. Displayed in attribute name entry box 2711 are the attributes and relationships amongst the attributes pertaining to a previously selected Business Class. By selecting an attribute, such as "Product", and clicking on select button 2713, attributes may be selected for inclusion in the OLAP dimension. In addition, dimensions may be further constructed of attributes belonging to other Business Classes which are related to the present Business Class. Selecting an attribute from attribute name entry box 2711 and clicking on navigate relationship button 2715, it is possible to refresh the contents of attribute name entry box 2711 with the attributes of the newly selected Business Class.

Figure 28:
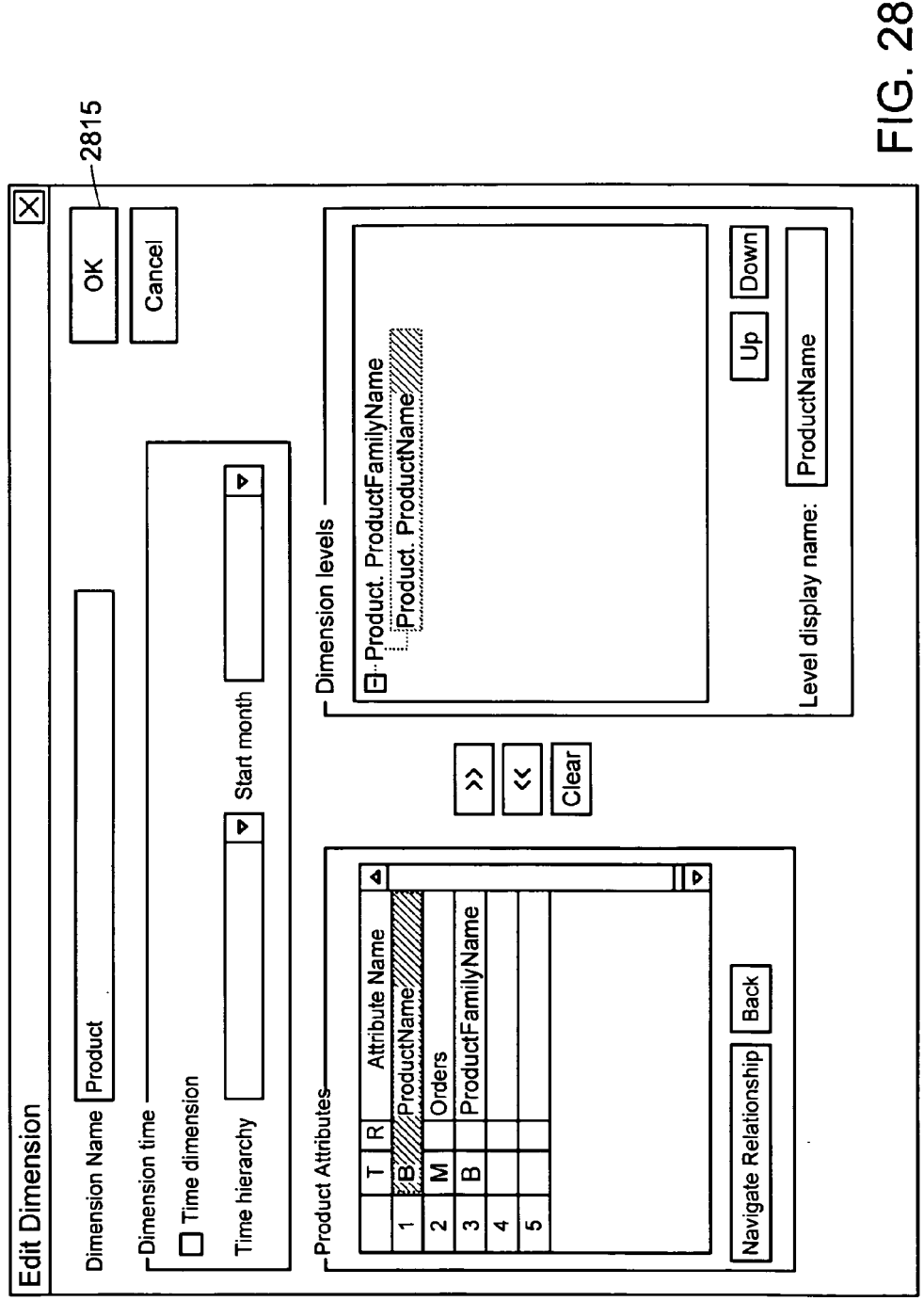
FIG. 28 is a screen dump of the Object Modeler of the present invention illustrating Business Class attribute navigation.
Figure 29:
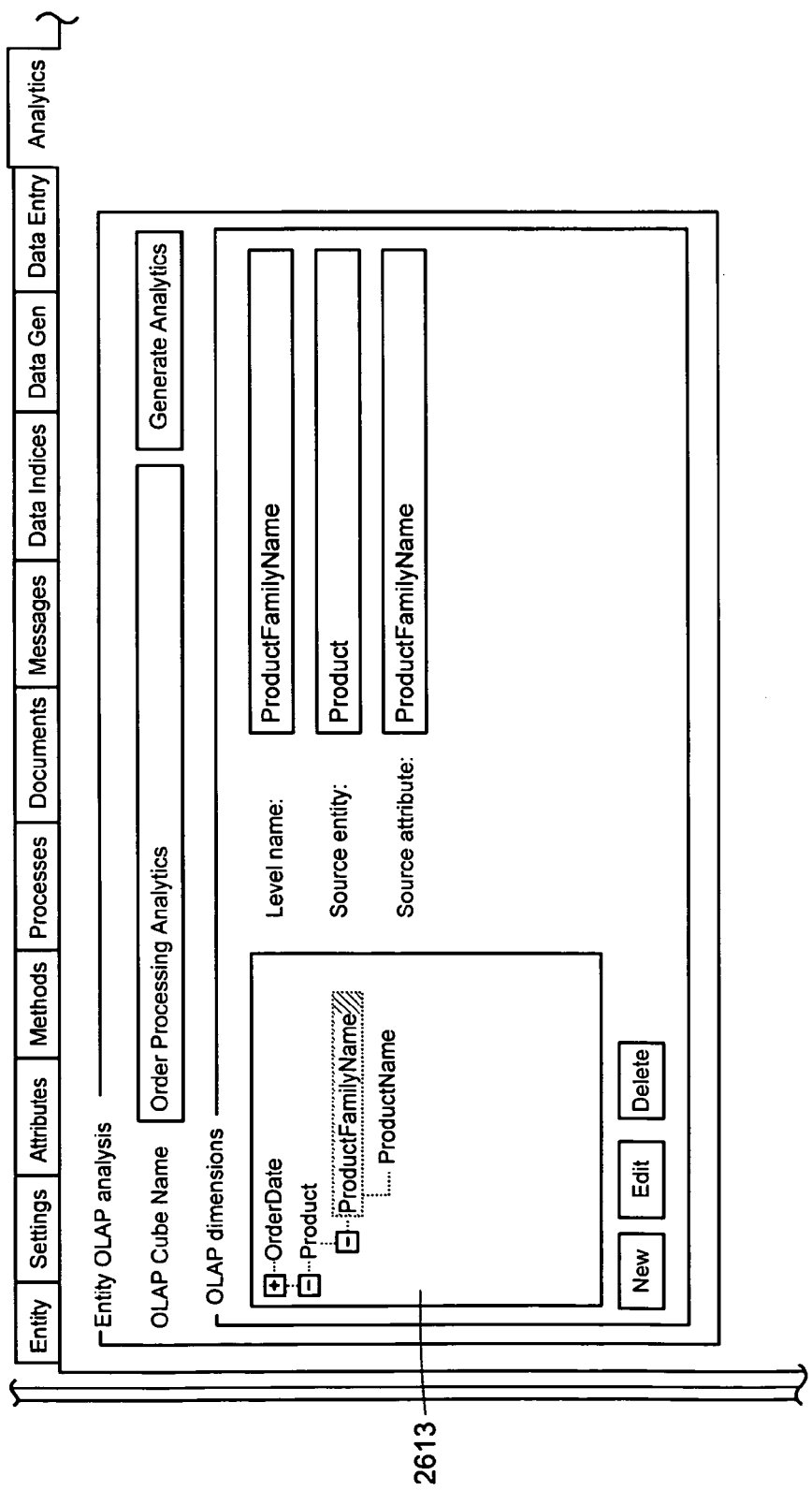
FIG. 29 is a screen dump of the Object Modeler of the present invention illustrating OLAP dimension definition.

With reference to FIG. 28, there is illustrated a window invoked by selecting the navigate relationship button 2715 of FIG. 27. Note that because none of the displayed Business Class attributes have a relationship to another Business Class, navigate relationship pushbutton 2715 is not available for selection. Clicking on OK button 2815 causes invocation of the window illustrated in FIG. 29. It will be noted that OLAP dimension diagram 2613 displays both defined OrderDate and Product OLAP dimension elements.

What is claimed is:

1. A method of data retrieval employing modeled business activities, comprising steps of:
   in a computer memory:
   A. forming a model modeling a business activity;
   B. using the model in developing a metric analysis profile;
   C. retrieving data elements of interest in accordance with the metric analysis profile; wherein forming the model in step A. comprises:
      (i) in computer memory, defining a plurality of classes, each class definition having attributes, processes and sub-processes corresponding to data elements of a given business activity being modeled, wherein attributes are characteristics and data types of the class, and the class serves as a generic definition of the corresponding data elements, instances of each class being dynamically allocated and stored in memory as data objects;
      (ii) in response to user input, in computer memory (a) logically grouping instances of classes to form subjects, (b) combining subjects to form a package and (c) constructing a data repository in memory based on the package, the classes, subjects, package and logical relationships therebetween modeling the given business activity;
      (iii) in computer memory, enabling user definition of the logical relationships, including enabling a user to (a) provide interactions and relationships between the plurality of classes and (b) define inheritance and ownership between classes such that the interactions represent the given business activity, different business activities being representable by different interactions, each business activity being able to be modeled as an interaction between respective classes; and
      (iv) storing the data repository as an operational database in a manner that enables user-selected data elements to be retrieved in accordance with the metric analysis profile;
   wherein using the model in step B. includes user specifying any combination of attributes, processes, sub-processes and data elements from the model for inclusion within the metric analysis profile; and
   wherein retrieving in step C. includes automatically generating executable code from the specified attributes, processes, sub-processes and data elements, the generated executable code enabling (i) retrieval of the specified data elements from the operational database and (ii) storing of the retrieved data elements in a staging database, in accordance with the metric analysis profile, and the executable code creating a populated staging database.

2. The method of claim 1, in response to a request to delete one of the plurality of classes, the method further comprising:
   automatically generating executable code for deleting the specified attributes, processes and sub-processes corresponding to the requested class; and
   for at least one of the plurality of classes depending from the requested class, further employing the generated code to effectively delete the at least one dependent class from the metric analysis profile including deleting both persistent and non-persistent data forming the at least one dependent class.

3. The method of claim 2 wherein the code for deleting includes code for de-allocating memory storage space in the operational database associated to the deleted class.

4. The method of claim 2 wherein the request for deletion is automatically generated in response to a change in the metric analysis profile.

5. The method of claim 1 wherein the step of storing as the operational database includes storing the plurality of classes and data elements as a repository based aggregation in accordance with the modeled interactions and relationships.

6. A system which when executed by computer memory retrieves data using a model of business activities, comprising:
   a computer memory;
   a graphical user interface (i) defining in the computer memory, a plurality of classes, each class definition having attributes, processes and sub-processes corresponding to data elements of a given business activity, wherein attributes are characteristics and data types of the class and the class serves as a generic definition of the corresponding data elements, instances of each class being dynamically allocated and stored in memory as data objects,
   (ii) obtaining user input, in computer memory, to (a) logically group instances of classes to form subjects, (b) combine subjects to form a package and (c) construct a data repository in memory based on the package, and the classes, subjects, package and logical relationships therebetween modeling the given business activity,
   and (iii) enabling user definition of the logical relationships, including enabling a user, in the computer memory, to (a) provide interactions and relationships between the plurality of classes, and (b) define inheritance and ownership between classes such that the interactions represent the given business activity, different business activities being representable by different interactions, each business activity being able to be modeled as an interaction between respective classes, and said graphical user interface enabling a user to select any combination of attributes, processes, sub-processes and data elements from the modeled given business activity for inclusion within a metric analysis profile; and
   an operational database storing said data repository in a manner that enables user-selected data elements to be retrieved in accordance with the metric analysis profile, wherein executable code is automatically generated from the user selected attributes, processes, sub-processes and data elements, the executable code enabling (i) retrieval of the selected data elements from the operational database and (ii) storing of the retrieved data elements in a staging database, in accordance with the metric analysis profile, and the executable code creating a populated staging database.

7. The system of claim 6, further comprising executable code automatically generated upon receipt of a request to delete one of said plurality of classes, said executable code for deleting said specified attributes, processes and sub-processes corresponding to said requested class.

8. The system of claim 7 wherein at least one of said plurality of classes depends from said requested class, said executable code includes logic for applying to said at least one dependent class and deleting persistent and non-persistent data of said at least one dependent class.

9. The system of claim 7 wherein said request for deletion is automatically generated in response to a change in said metric analysis profile.

10. Computer-based method for modeling business activities in connection with data retrieval, the method comprising the steps of:
    defining in computer memory, a plurality of classes, each class definition having attributes, processes and sub-processes corresponding to data elements of business activities, wherein attributes are characteristics and data types of the class and the class serves as a generic definition of the corresponding data elements;
    modeling in computer memory business activities as interactions and relationships between the plurality of classes, said plurality of classes enabling various business activities to be modeled as interactions between classes;
    for each instance of a class, dynamically allocating and storing in memory a respective data object;
    in computer memory, logically relating and hierarchically grouping instances of classes to form a package, the package and logical relationships between classes in the package modeling a given business activity;
    in computer memory, enabling user definition of the logical relationships, including enabling a user to (a) provide interactions and relationships between the plurality of classes and (b) define inheritance and ownership between classes such that the interactions represent the given business activity; and
    based on the package, storing the plurality of classes, the user-defined logical relationships and the data elements in an operational database in a manner that enables user-selected data elements to be retrieved in accordance with a metric analysis, wherein user specifying any combination of attributes, processes, sub-processes and data elements from the modeled given business activity for inclusion within the metric analysis automatically generates executable code, the generated executable code enabling (i) retrieval of the specified data elements from the operational database and (ii) storing of the retrieved data elements in a staging database, in accordance with the metric analysis, and the executable code creating a populated staging database.

11. Computer-based method of claim 10 further including in response to a request to delete one of the plurality of classes,
    automatically generating executable code for deleting the attributes, processes and sub-processes corresponding to the requested class; and
    for at least one of the plurality of classes depending from the requested class, further employing the generated code to effectively delete the at least one dependent class including deleting both persistent and non-persistent data forming the at least one dependent class.

12. Computer-based method of claim 11 wherein the code for deleting includes code for de-allocating memory storage space in the operational database associated to the deleted class.

13. Computer-based method of claim 11 wherein the request for deletion is automatically generated in response to a change in the metric analysis profile.

14. Computer-based method of claim 10 wherein the storing in the operational database includes storing the plurality of classes and data elements as a repository based aggregation in accordance with the modeled interactions and relationships.

* * * * *